United States Patent
Nesvadba et al.

(10) Patent No.: US 6,323,267 B1
(45) Date of Patent: Nov. 27, 2001

(54) ISOXINDIGOS USEFUL AS COLORANTS AND PREPARATION THEREOF

(75) Inventors: Peter Nesvadba, Marly (CH); Joachim Jandke, Steinen (DE)

(73) Assignee: CIBA Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 09/146,871

(22) Filed: Sep. 3, 1998

(30) Foreign Application Priority Data

Sep. 10, 1997 (CH) .................................................. 2128/97
Mar. 11, 1998 (CH) .................................................. 0581/98

(51) Int. Cl.[7] .................................................. C08K 5/15
(52) U.S. Cl. ................................. 524/109; 549/302
(58) Field of Search .............................................. 524/109

(56) References Cited

U.S. PATENT DOCUMENTS

| | | | |
|---|---|---|---|
| 5,106,412 | 4/1992 | Bogan ..................................... | 75/570 |
| 5,614,572 | 3/1997 | Nesvadba et al. .................... | 524/111 |
| 5,820,666 | 10/1998 | Bäbler ..................................... | 106/412 |
| 5,827,364 | 10/1998 | Hendi ..................................... | 106/495 |
| 5,843,220 | 12/1998 | Bäbler ..................................... | 106/415 |

FOREIGN PATENT DOCUMENTS 0654711    5/1995    (EP).

OTHER PUBLICATIONS

Marschalk, Bull. Soc. Chim. FR. 9/5, pp. 826–833, (1942).
Bernatek et al, Acta Chem. Scan. 3, (1949), pp. 1117–1127.
Klingsberg, Chem. Reviews, vol. 54, (1954), pp. 59–77.
Bloom, J. Am. Chem. Soc., vol. 83, (1961) pp. 3808–3812.
Chatterjea et al., Jour. Indian Chem. Soc., vol. 45, No. 1, (1968), pp. 35–44.
Becker et al., J. Org. Chem., vol. 47, (1982), pp. 1095–1101.
Bigi et al., Tetrahedron vol. 39, No. 13, pp. 2147–2150, (1983).
Nicolaides et al., J. Chem. Soc. Perkin Trans. 1, (1992) pp. 2479–2484.
Becker et al., Aust. J. Chem., vol. 38, (1985), pp. 85–96.
Stork et al., J. Amer. Chem. Soc., vol. 78, (1956), pp. 4604–4608.
Fujisawa et al., J. Org. Chem., vol. 38, No. 4, (1973) pp. 687–690.
Zhenkun et al., J. Org. Chem., vol. 56, (1991), pp. 6110–6114.
Becker et al., J. Org. Chem., vol. 42, No. 18, (1977), pp. 2966–2973.
Chatterjea, Jour. Indian Chem. Soc., vol. 36, No. 2, (1959), pp. 68–75.
Saalfrank et al., Chem. Ber., vol. 113, pp. 2950–2958, (1980).
Derwent Abstract 1992:129282.
Garcia et al., Rev. Latinoamer. Quím. 22/I, pp. 7–8, (1991).
Chovin, Bull. Soc. Chim. FR., vol. 11, (1944), pp. 82–90.

*Primary Examiner*—Paul R. Michl
(74) *Attorney, Agent, or Firm*—David R. Crichton

(57) ABSTRACT

The present invention relates to a process for coloration of a high molecular weight material by admixing said high molecular weight organic or inorganic material, preferably high molecular weight organic material, prior to processing with at least one compound of the formula:

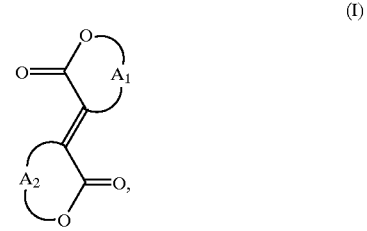

where $A_1$ and $A_2$ are independently unsubstituted, monosubstituted, disubstituted, trisubstituted or tetrasubstituted o-$C_6$–$C_{18}$arylene. The invention further relates to compositions of matter comprising isoxindigo compounds and high molecular weight organic material. The invention also relates to processes for preparing the compound of the formula (I) and also to novel isoxindigo compounds which can be symmetrical or asymmetrical or else have a bisisoxindigo structure.

22 Claims, No Drawings

ISOXINDIGOS USEFUL AS COLORANTS AND PREPARATION THEREOF

This invention relates to the use of (E)-[3,3']-bibenzofuranylidene-2,2'-diones ("isoxindigos") as colorants for the mass coloration of high molecular weight organic materials, to novel compositions of matter comprising isoxindigos, to novel isoxindigos and also to a novel process for preparing isoxindigos.

Isoxindigos are closely related to Pechmann dyes and are sometimes even referred to as such. Pechmann dyes, as disclosed in Chem. Reviews 54, 59 (1954), are known for dyeing wool and silk, but the results are unsatisfactory, since the light stability in particular proves to be inadequate. Like Pechmann dyes, isoxindigos are chemically relatively unstable and are converted, for example, by base catalysis or even thermally into the differently coloured, thermodynamically more stable naphthyrone isomers:

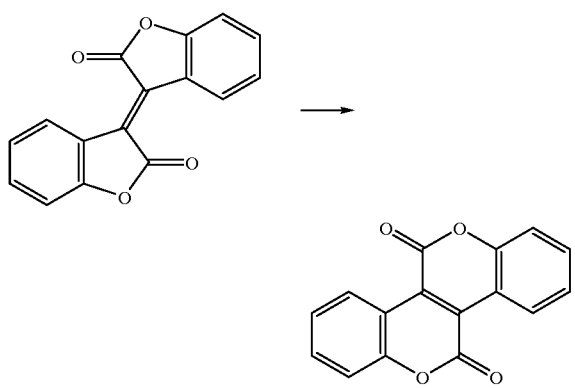

Isoxindigos have a wide range of colours which varies with the substitution pattern and extends from yellow via red and blue through to black [J. Org. Chem. 47/6, 1095 (1982); J. Chem. Soc. Perkin I, 2479 (1992)]. The colour results mainly from a charge transfer absorption which is enhanced by methoxy substituents, although twisting and length of the central double bond due to steric hindrances is additionally said to play a part [Aust. J. Chem. 38, 85 (1985)].

It has now been found that, surprisingly, isoxindigos are excellent colorants for mass coloration of polymers, producing nonmigrating colours which are very light- and heat-fast. Unlike conventional colorants having comparable colour properties, the colorants of this invention advantageously contain no heavy metals. The solubility of the isoxindigos of this invention in organic solvents is highly structure-dependent, making them readily conformable to the desired specifications, which is an advantage. The isoxindigos of this invention are highly useful as colorants for the mass coloration of a high molecular weight organic material, and they can be present in the substrate to be coloured in a dissolved state (like dyes) and/or in a finely dispersed state (like pigments).

The present invention accordingly provides a process for coloration of a high molecular weight material, in particular in the mass, which comprises admixing said high molecular weight organic or inorganic material, preferably high molecular weight organic material, preferably prior to processing, with at least one compound of the formula

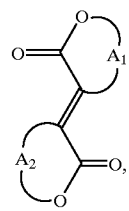

(I)

where $A_1$ and $A_2$ are independently unsubstituted, monosubstituted, disubstituted, trisubstituted or tetrasubstituted o-$C_6$–$C_{18}$arylene.

o-$C_6$–$C_{18}$Arylene is, for example, 1,2-phenylene, 1,2-naphthylene, 2,3-naphthylene, 1,2-phenanthrylene, 2,3-phenanthrylene, 3,4-phenanthrylene or 9,10-phenanthrylene. In the case of substituted o-$C_6$–$C_{18}$arylene the substituents may be independently of each or one another any desired atoms, groups of atoms or radicals which, depending on their valency, may be singly or multiply attached to $A_1$ or to $A_2$. Bivalent radicals for example, such as 1,3-butadien-1,4-ylene or —CH=CH—NH—, may form an additional 5- or 6-membered ring fused onto $A_1$ and $A_2$.

The compounds of the formula (I) are, for example, symmetrical or asymmetrical isoxindigos. In the case of substituted o-$C_6$–$C_{18}$arylene the substituent can be, for example, a bridge leading to a further isoxindigo. In this bisisoxindigo structure, two isoxindigos may be joined together, for example, via an alkylene, cycloalkylene, polycycle, aryl or heteroaryl bridge.

Preference is given to using an isoxindigo of the formula

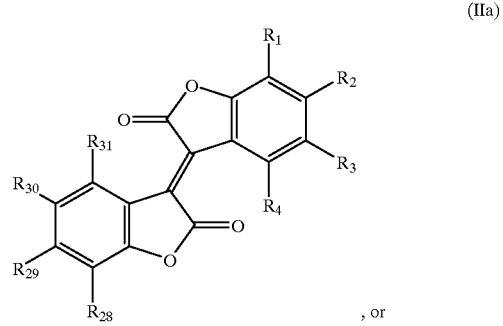

(IIa)

, or a bisisoxindigo of the formula:

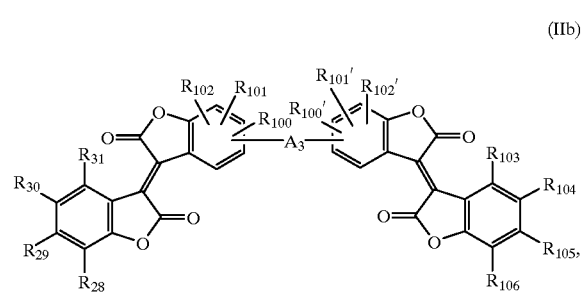

(IIb)

where $A_3$ is a single bond or unsubstituted or halogen-, hydroxyl-, oxo-, cyano-, $R_6OOC$—, $X^+O^-C$—, $R_6O_3S$—, $X^+O_3^+S$-monosubstituted or -polysubstituted $C_1$–$C_{24}$alkylene or $C_5$–$C_{12}$cycloalkylene, or a polycycle which may be interrupted by heteroatoms such as O, N, S or P, or $C_6$–$C_{24}$aryl and $C_5$–$C_{18}$heteroaryl which may be uninterrupted or singly or multiply interrupted by O, S or $NR_6$, $R_{100}$, $R_{101}$, $R_{102}$, $R_{100'}$, $R_{102'}$ and also $R_{103}$, $R_{104}$, $R_{105}$ and $R_{106}$ each independently have the same meaning as $R_1$, $R_1$, $R_2$, $R_3$, $R_4$ and also $R_{28}$, $R_{29}$, $R_{30}$ or $R_{31}$, are independently H, halogen, cyano, $NO_2$, $R_5$, $NR_5R_6$, $NR_7COR_5$, $NR_7COOR_5$, $N=CR_5R_6$, $CONR_7R_8$, $OR_5$, $COOR_5$, $(C_1$–$C_{12}$alkyl)-COOR, $COO^-X^+$, $SR_5$, $SOR_5$, $SO_2R_5$, $SO_2NR_7R_8$, $SO_3R_5$ or $SO_3^-X^+$, and optionally $R_1$ and $R_2$, $R_2$ and $R_3$, $R_3$ and $R_4$ or $R_5$ and $R_6$ and also $R_{28}$ and $R_{29}$, $R^{29}$ and $R_{30}$ or $R_{30}$ and $R_{31}$ may each be additionally joined together by a direct bond (with abstraction of a hydrogen on each of the two atoms connected by the bond) to form a 5- or 6-membered ring, $R_5$ is hydrogen, unsubstituted or halogen- or hydroxyl-, oxo-, cyano-, $R_6OOC$— or $X^+O^-OC$-monosubstituted or -polysubstituted $C_1$–$C_{25}$alkyl, $C_5$–$C_{12}$cycloalkyl or $C_2$–$C_{24}$alkenyl, which may be uninterrupted or singly or multiply interrupted by O, S or $NR_6$, or is unsubstituted or halogen-, nitro-, cyano-, $R_6O$—, $R_6S$—, $R_8R_7N$—, $R_8R_7NOC$—, $R_6OOC$—, $X^+O^-OC$—, $R_6O_2S$—, $R_8R_7NO_2S$—, $R_6O_3S$—, $X^+O_3^-S$—$R_6OCR_7$ or $R_6OOCR_7N$-monosubstituted or -polysubstituted $C_6$–$C_{18}$aryl, $C_7$–$C_{18}$aralkyl or $A_5$–$A_{18}$heteroaryl, $R_6$ is hydrogen, unsubstituted or halogen- or hydroxyl-, oxo- or cyano-monosubstituted or -polysubstituted $C_1$–$C_{25}$alkyl or $C_2$–$C_{24}$alkenyl, which may be uninterrupted or singly or multiply interrupted by O, S or $NR_7$, or is unsubstituted or halogen-, nitro-, cyano-, hydroxyl-, $R_7O$—, $R_7S$—, $R_8R_7N$—,$R_8R_7NOC$—, $R_7OOC$—, HOOC—, or $X^+O^-OC$-monosubstituted or -polysubstituted $C_6$–$C_{18}$aryl, $C_7$–$C_{18}$aralkyl or $A_5$–$A_{18}$heteroaryl, $R_7$ and $R_8$ are singly H, $C_6$–$C_{18}$aryl, $C_7$–$C_{18}$aralkyl, unsubstituted or halogen-, hydroxyl- or $C_1$–$C_{12}$alkoxy-monosubstituted or -polysubstituted $C_1$–$C_{25}$alkyl or $C_2$–$C_{24}$alkenyl, or $R_7$ and $R_8$ combine with the common N to form unsubstituted or $C_1$–$C_4$alkyl-monosubstituted, -disubstituted, -trisubstituted or -tetrasubstituted pyrrolidine, piperidine, piperazine or morpholine or to form carbazole, phenoxazine or phenothiazine, $X^+$ is a cation $Li^+$, $Na^+$, $K^+$, $Mg^{++}{}_{1/2}$, $Ca^{++}{}_{1/2}$, $Sr^{++}{}_{1/2}$, $Ba^{++}{}_{1/2}$, $Cu^+$, $Cu^{++}{}_{1/2}$, $Zn^{++}{}_{1/2}$, $Al^{+++}{}_{1/3}$, or $[NR_7R_8R_{10}R_{11}]^+$, and $R_{10}$ and $R_{11}$ are singly H, $C_1$–$C_{25}$alkyl, $C_6$–$C_{18}$aryl or $C_7$–$C_{18}$aralkyl.

In the case of a polysubstituted group, various substituents may be combined.

In a further embodiment of the process of this invention, the high molecular weight organic or inorganic material may optionally also be admixed with a plurality of compounds, preferably 2 to 10, particularly preferably 2 or 3, compounds, of the formula (I).

Alkyl, alkenyl or alkylene can be straight-chain, branched, monocyclic or polycyclic. Preference is given to $C_1$–$C_{12}$alkyl, $C_2$–$C_{12}$alkenyl or $C_2$–$C_{24}$alkylene. $C_1$–$C_{12}$Alkyl is therefore, for example, methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethylhexyl, nonyl, trimethylcyclohexyl, decyl, menthyl, thujyl, bornyl, 1-adamantyl, 2-adamantyl or dodecyl.

$C_1$–$C_{24}$Alkylene is therefore, for example, methylene, ethylene, n-propylene, isopropylene, n-butylene, sec-butylene, isobutylene, tert-butylene, cyclobutylene, n-pentylene, 2-pentylene, 3-pentylene, 2,2-dimethylpropylene, cyclopentylene, cyclohexylene, n-hexylene, n-octylene, 1,1,3,3-tetramethylbutylene, 2-ethylhexylene, nonylene, trimethylcydohexylene, decylene, menthylene, thujylene, bornylene, 1-adamantylene, 2-adamantylene, dodecylene, tetradecylene, hexadecylene, heptadecylene, octadecylene, eicosylene, heneicosylene, docosylene or tetracosylene.

$C_2$–$C_{12}$Alkenyl is $C_2$–$C_{12}$alkyl having single or multiple unsaturation, two or more double bonds being optionally isolated or conjugated, for example vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 2,5-hexadien-2-yl, 1-p-menthen-8-yl, 4(10)-thujen-10-yl, 2-norbornen-1-yl, 2,5-norbornadien-1-yl, 7,7-dimethyl-2,4-norcaradien-3-yl or the various isomers of hexenyl, octenyl, nonenyl, decenyl or dodecenyl.

$C_1$–$C_{12}$Alkoxy is O—$C_1$–$C_{12}$alkyl, preferably O—$C_1$–$C_4$alkyl.

O-interrupted $C_1$–$C_{12}$alkyl is, for example, $C_4$alkyl, such as in particular —$CH_2$—$CH_2$—O—$CH_2$—$CH_3$. Doubly O-interrupted $C_1$–$C_{12}$alkyl is, for example, $C_6$alkyl, such as in particular —$CH_2$—$CH_2$—O—$CH_2$—$CH_2$—O—$CH_2$—$CH_3$. Oxo-substituted $C_1$–$C_{12}$alkyl is, for example, $C_2$alkyl, such as in particular —C(=O)—$CH_3$. Oxo-substituted and O-interrupted $C_1$–$C_{12}$alkyl is, for example, $C_8$alkyl, such as in particular —$(CH_2)_3$—O—C(=O)—$C(CH_3)_3$, —C(=O)—$(CH_2)_6$—$OCH_3$ or —$C(CH_3)_2$—COO—$(CH_2)_3$—$CH_3$.

O-interrupted $C_1$–$C_{24}$alkylene is, for example, $C_4$alkylene, such as in particular —$CH_2$—$CH_2$—O—$CH_2$—$CH_2$—. Doubly O-interrupted $C_1$–$C_{24}$alkyl is, for example, $C_6$alkylene, such as in particular —$CH_2$—$CH_2$—O—$CH_2$—$CH_2$—O—$CH_2$—$CH_3$. Oxo-substituted $C_1$–$C_{24}$alkylene is, for example, $C_2$alkylene, such as in particular —C(=O)—$CH_2$—. Oxo-substituted and O-interrupted $C_1$–$C_{24}$alkylene is, for example, $C_8$alkylene, such as in particular —$(CH_2)_3$—O—C(=O)—$C(CH_3)_3$, —C(=O)—$(CH_2)_6$—$OCH_2$— or —$C(CH_3)_2$—COO—$(CH_2)_3$—$CH_2$—. The single or multiple substitution with halogen, hydroxyl, oxo or cyano and the single or multiple interruption by O, S or N generally affect the chemical reactivity of an alkyl, alkenyl or alkylenyl group only minimally. The person already skilled in the art will therefore have no problems identifying further possible variations.

$C_5$–$C_{12}$Cycloalkylene is, for example, cyclopentyl, cyclohexyl, cycloheptyl, cyclooctyl, cyclononyl, cyclodecyl, cycloundecyl, or cyclododecyl, preferably cyclopentyl, cycloyhexyl and cycloheptyl.

A polycycle which may be interrupted by hetero atoms e.g. by O, N, S or P is, for example, an aromatic, aliphatic, or aromatic and aliphatic polycycle such as polyether, for example a crown-ether or polyamine or polythio ether, or octahydroquinolizine or tetradecahydroacridine.

Preferred aralkyl and aryl are $C_7$–$C_{12}$aralkyl and $C_6$–$C_{12}$aryl, respectively.

$C_7$–$C_{12}$Aralkyl is, for example, benzyl, 2-benzyl-2-propyl, β-phenylethyl, 9-fluorenyl, α,α-dimethylbenzyl, ω-phenylbutyl or ω,ω-dimethyl-ω-phenylbutyl.

$C_6$–$C_{24}$Aryl is, for example, phenyl, 1-naphthyl, 2-naphthyl, 4-biphenylyl, 2-fluorenyl, phenanthrene, anthracene, naphthacene or pentacene.

$C_6$–$C_{12}$Aryl is, for example, phenyl, 1-naphthyl, 2-naphthyl, 4-biphenylyl or 2-fluorenyl.

$A_5$–$A_{18}$Heteroaryl is a polyunsaturated heterocyclic structure of 5 to 18 atoms selected from C, N, O and S which contains at least 6 conjugated π-electrons. Examples of $A_5$–$A_{18}$heteroaryl are thienyl, benzo[b]thienyl, dibenzo[b,d]thienyl, furyl, furfuryl, 2H-pyranyl, benzofuranyl, isobenzofuranyl, dibenzofuranyl, phenoxythiinyl, pyrrolyl, imidazolyl, pyrazolyl, pyridyl, bipyridyl, triazinyl, pyrimidinyl, pyrazinyl, pyridazinyl, indolizinyl, isoindolyl, indolyi, indazolyl, purinyl, quinolizinyl, quinolyl, isoquinolyl, phthalazinyl, naphthyridinyl, quinoxalinyl, quinazolinyl, cinnolinyl, pteridinyl, carbazolyl, carbolinyl, benzotriazolyl, benzoxazolyl, phenanthridinyl, acridinyl, perimidinyl, phenanthrolinyl, phenazinyl, isothiazolyl, phenothiazinyl, isoxazolyl, furazanyl or phenoxazinyl, preferably mono- and bicyclic heteroaromatic radicals.

Halogen is chlorine, bromine, fluorine or iodine, preferably fluorine or chlorine. Halogen-, hydroxyl-, $C_1$–$C_{12}$alkoxy- or cyano-monosubstituted or -polysubstituted $C_1$–$C_{12}$alkyl or $C_2$–$C_{12}$alkenyl is, for example, 2-chloroethyl, trifluoromethyl, pentafluoroethyl, β,β,β-trifluoroethyl, trichlorovinyl, ω-chloropropyl, bromobutyl, perfluorohexyl, perfluorododecyl, 2-hydroxyethyl, 2-methoxyethyl, 2-ethoxyethyl, 2-butoxyethyl, 2,3-dihydroxypropyl, 2,3dimethoxypropyl, 2,3dimethoxypropyl or 2-cyanoethyl, preferably trifluoromethyl, 2-hydroxyethyl, 2-methoxyethyl, 2-ethoxyethyl or 2-cyanoethyl.

Particular preference is given to using an isoxindigo of the formula

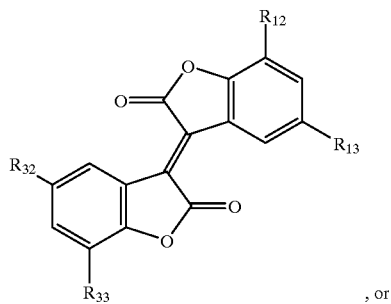

(III)

, or a bisisoxindigo of the formula:

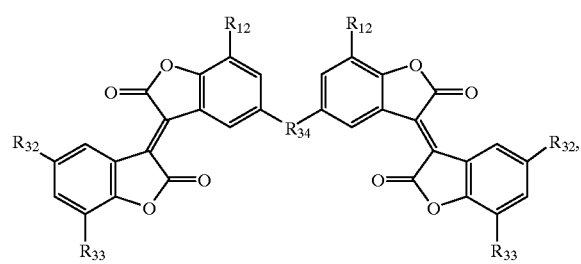

(IV)

where $R_{12}$, $R_{13}$, $R_{32}$ and $R_{33}$ are independently H, halogen, $NO_2$, $R_{14}$, ($C_1$–$C_{12}$alkyl)—$COOR_5$, $OR_{14}$, $SR_{14}$, $OC_9$—$C_{18}$alkyl or $SC_9$—$C_{18}$alkyl, and $R_{34}$ is a single bond, $C_1$–$C_{24}$alkylene or $C_5$–$C_{12}$cycloalkylene, where $R_{14}$ is unsubstituted or oxo-, cyano- or X1+O−OC-monosubstituted or -polysubstituted $C_1$–$C_{25}$alkyl, which may be uninterrupted or singly or multiply interrupted by O, or is unsubstituted or halogen-, nitro-, cyano-, $R_{16}O$—, $R_{17}R_{16}N$—, $R_{17}R_{16}N$—, $R_{17}R_{16}NOC$—, $R_{16}OCR_{18}N$— or $R_{16}OOCR_{18}N$-monosubstituted or -polysubstituted $C_6$–$C_{10}$aryl or $C_7$–$C_{10}$araklyl, X1+ is a cation $Na^+$, $K^+$, $Mg^{++}_{1/2}$, $Ca^{++}_{1/2}$, $Zn^{++}_{1/2}$, $Al^{+++}_{1/3}$, or $[NR_{16}R_{17}R_{18}R_{19}]^+$, and $R_{16}$ and $R_{17}$ are independently H, $C_6$–$C_{10}$aryl, $C_7$–$C_{10}$aralkyl, unsubstituted or halogen-, hydroxyl- or $C_1$–$C_4$alkoxy-monosubstituted or -polysubstituted $C_1$–$C_8$alkyl, or $R_{16}$ and $R_{17}$ combine with the common N to form unsubstituted or $C_1$–$C_4$alkyl-monosubstituted, -disubstituted, -trisubstituted or -tetrasubstituted pyrrolidine, piperidine, piperazine or morpholine, and $R_{18}$ and $R_{19}$ are independently H, $C_1$–$C_8$alkyl, $C_6$–$C_{10}$aryl or $C_7$–$C_{10}$aralkyl.

Very particular preference is given to using an isoxindigo of the formula:

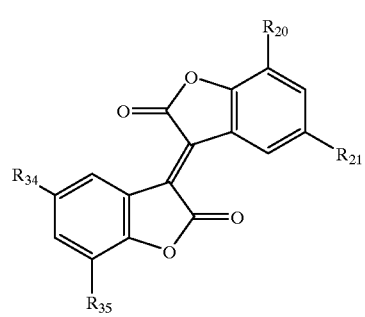

(V)

, or a bisisoxindigo of the formula:

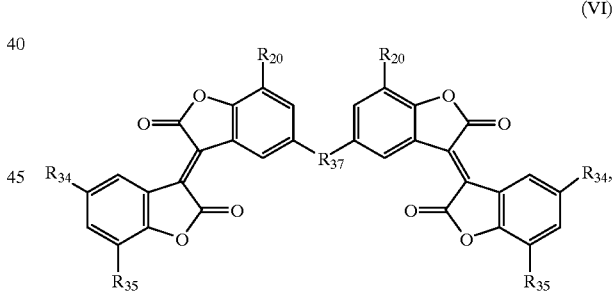

(VI)

where $R_{20}$, $R_{21}$, $R_{34}$ and $R_{35}$ are independently H, chlorine, $R_{22}$, $C_2H_5$—COOH, $C_2H_5$—COO($C_1$–$C_{12}$alkyl), $OR_{22}$, $SR_{22}$, $OC_9$–$C_{18}$alkyl or $SC_9$–$C_{18}$alkyl and $R_{37}$ is a single bond, $C_1$–$C_8$alkylene or $C_5$–$C_6$-cycloalkylene, $R_{22}$ is unsubstituted or oxo-, cyano- or $X2^+O^-OC$-monosubstituted or -polysubstituted $C_1$–$C_8$alkyl, which may be uninterrupted or singly or multiply interrupted by O, or is $C_6$–$C_{10}$aryl or $C_7$–$C_{10}$aralkyl, $X2^+$ is a cation $Na^+$, $K^+$, $Mg^{++}_{1/2}$, $Ca^{++}_{1/2}$, $Zn^{++}_{1/2}$, $Al^{+++}_{1/3}$, or $[NR_{24}R_{25}R_{26}R_{27}]^+$, $R_{24}$, $R_{25}$ and $R_{26}$ are independently H, $C_1$–$C_4$alkyl or phenyl, and $R_{27}$ is H, $C_1$–$C_8$alkyl, $C_6$–$C_{10}$aryl or $C_7$–$C_{10}$aralkyl.

Most particular preference is given to using an isoxindigo of the formula:

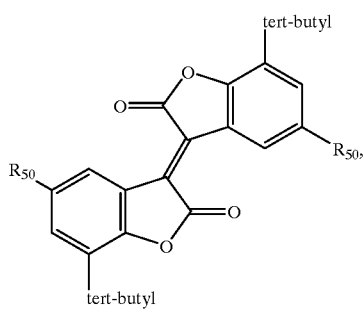

(XLIV)

where $R_{50}$ is tert-butyl, O—$CH_3$, $CH_2CH_2COOH$ or $CH_2CH_2COO(C_1$–$C_{12}$alkyl).

Some compounds of the formula (I), (IIa), (IIb), (III), (IV), (V) or (VI) are new. The invention therefore also relates to a compound of the formula:

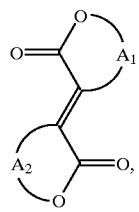

(VII)

where $A_1$ and $A_2$ are independently unsubstituted or monosubstituted, disubstituted, trisubstituted or tetra-substituted o-$C_6$–$C_{18}$arylene, with the provisos that
$A_1$ and $A_2$ are not both phen-1,2-ylene, 6-methylphen-1,2-ylene, 6-isopropylphen-1,2-ylene, 6-tert-butylphen-1,2-ylene, 4-methyl-6-tert-butylphen-1,2-ylene, 4-tert-butyl-6-methylphen-1,2-ylene, 4,6-di-tert-butylphen-1,2-ylene, 4-methoxy-6tert-butylphen-1,2-ylene, 5-methoxyphen-1,2-ylene, 3-carboxy-5-methylphen-1,2-ylene, 3-methoxycarbonyl-5-methylphen-1,2-ylene, anthraquinon-1,2-ylene, phenanthren-9,10-ylene or 1-oxa-2,2-dimethyl-3-acetoxy-5-methylacenaphthen-6,7-ylene, and that
when $A_1$ is phen-1,2-ylene $A_2$ is not 5-methoxyphen-1,2-ylene, 4,6-dihydroxyphen-1,2-ylene, naphth-1,2-ylene or naphth-2,1-ylene and when $A_1$ is 3-methoxycarbonyl-5-methylphen-1,2-ylene $A_2$ is not 3,5-dimethylphen-1,2-ylene,
and o-$C_6$–$C_{18}$arylene is attached to the lactone oxygen with the first locant indicated for the diradical.

For some compounds of the formula (I), (IIa), (III), (IV) or (V), the crystal structure is known from x-ray crystal analysis, and polymorphism was found for at least one compound [Aust. J. Chem. 38, 85 (1985)]. In the case of polymorphism, each polymorphic form is in principle useful as colorant.

Preference is given to compounds of the formula (VII) which conform to the formula (IIa), (IIb). Particular preference is given to compounds of the formula (VII) which conform to the formula (III) or (IV). Very particular preference is given to compounds of the formula (VII) which conform to the formula (V) or (VI).

The present invention further relates to compositions comprising 2 to 10, preferably 2 or 3, compounds of the formula (I) or (VII) and/or (IIb).

The molar ratio of the composition comprising two compounds of the formula (I) or (VII) and/or (IIb) is customarily within the range from 99:1 to 1:99.

If three compounds of the formula (I) are used, they can be in particular compounds of the formulae:

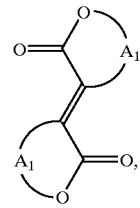

(VIII)

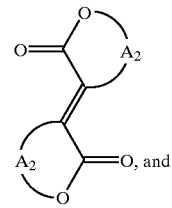

(IX)

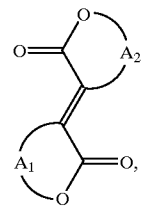

(X)

where $A_1$ and $A_2$ differ.

The molar ratio of the compositions of this invention comprising the above three compounds is customarily within the range from 98:1:1 to 1:98:1 or 1:1:98, preferably within the range of 25:50:25, based on (VIII):(X):(IX).

The compositions comprising 2 to 10 compounds may be prepared by conventional methods of mixing individual compounds or else, in the case of the three-component mixtures, by direct synthesis, which will be more particularly described hereinbelow.

The compounds of the formula (I) can be prepared from known starting materials by known methods or in close similarity thereto.

A 3-methylenefuranonyl compound of the formula (XII):

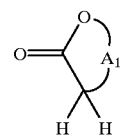

and a 3oxofuranonyl compound of the formula (XIV):

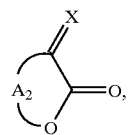

where X is O or N-aryl, can be reacted in equimolar amounts with a dehydrating reagent, for example with acetic anhydride or with phosphorus tribromide [Bull.

Soc. Chim. Fr. 9/5, 826 (1942); Chem. Reviews 54, 59 (1954); J. Indian Chem. Soc. 45/1, 35 (1968)].

The condensation of 3-oxobenzofuranone with 3-methylenebenzofuranone is described by J. N. Chaterjea in J. Indian Chem. Soc., 36, 70 (1959). However, the dehydrating reagent used in this reference is phosphorus tribromide, which is ecologically problematic.

The invention therefore also provides a more ecological process for condensing 3-oxofuranonyl compounds with 3methylenefuranonyl compounds, which comprises reacting differently substituted 3-methylenefuranonyl compounds of the formula (XIII):

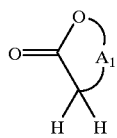

with 3-oxofuranonyl compounds of the formula (XIV):

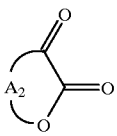

using hydrochloric acid, sulfuric acid, organic acids or bases to form asymmetrical isoxindigos (IIa) or bisisoindigos (IIb), where $A_1$ and $A_2$ are different and independently conform to the meaning given above.

The reaction is generally initiated by contacting a 3-methylenefuranonyl compound with a 3-oxofuranonyl compound and with the dehydrating reagent in a conventional manner, for example by mixing the starting materials or by dropwise addition of one starting material to the other.

The dehydrating reagent used can be an acid or a base. For example, inorganic acids, such as hydrochloric acid or sulfuric acid, organic acids such as arylsulfonic acids, especially p-toluenesulfonic acid, or alkyl acids such as formic acid or acetic acid, especially trifluoroacetic acid, can be used. Examples of useful bases are organic nitrogen bases, such as triethylamine, piperidine, pyridine, morpholine, or aliphatic alkoxides, for example methoxide, ethoxide, propoxide or butoxide, or aromatic alkoxides, for example phenoxide.

The solvent used can be an organic acid, for example acetic acid.

In general, the molar ratio of 3-methylenefuranonyl compound to 3-oxofuranonyl compound will be within the range from 1:1 to 3:1, and preferably the molar ratio is 1:1.

In general, the molar ratio of dehydrating agent to 3-oxofuranonyl compound will be within the range from 0.001:1 to 5:1, preferably within the range from 0.001:1 to 1:1.

Preferably, the reaction temperature used will be a temperature at which the reaction mixture boils, the reaction temperature is within the range of the boiling temperature of the solvent used.

The reaction mixture can be worked up in a conventional method, for example by addition of water and subsequent repeated extraction of the crude product with an organic solvent, such as toluene. The organic phase comprising the crude product can be washed with water and then evaporated. If desired, the product is admixed with methanol and then filtered, the product being obtained as filter residue.

The starting materials for this process are prepared similarly to known processes.

3-Methylenefuranonyl compounds can be prepared, for example, from phenols by reaction with glyoxal similarly to the method of H. -D. Becker, K. Gustafsson, J. Org. Chem. 42, 2966 (1977). 3-Oxofuranonyl compounds can be prepared by oxidation of 3-hydroxyfuranonyl compounds by commonly known methods for oxidizing hydroxy to keto compounds. These are described, for example, in Houben-Weyl, Methoden der Organischen Chemie, 4th Edition, Volume 4/1a & 4/1b. Z-Ma, J. M. Bobbitt in J. Org. Chem., 56, 6110 (1991) describe the oxidation with nitroxides. 3Hydroxyfuranonyl compounds can be prepared similarly to the process involving 3-hydroxybenzofuranones that is described in U.S. Pat. No. 5,614,572.

Preferably, the bisisoxindigos (IIb) are prepared from bis-3-oxofuranonyl compounds of formula (XXXII)

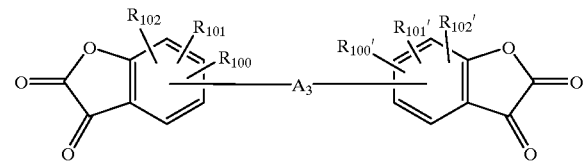

or bis-3-methylenefuranonyl compounds of the formula (XXXIII)

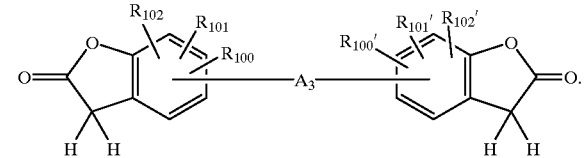

The synthesis from bis-3-oxofuranonyl compounds (XXXII) preferably takes the form of a reaction with one 3-methylenefuranonyl compound (XXXIII) or, if desired, with a mixture of two differently substituted 3-methylenefuranonyl compounds (XXXIII).

For example, it is also possible to react a compound of the formula (XIII):

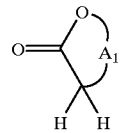

with an oxidizing agent, for example with thionyl chloride, sulfur dichloride or bromine in nitrobenzene, with anhydrous iron(III) chloride or chromic(VI) acid in glacial acetic acid, with potassium permanganate in acetone, with selenium dioxide in acetic anhydride, with pyridinium hydrobromide perbromide in acetic acid or with selenium in a sealed tube [Bull. Soc. Chim. Fr. 9/5, 826 (1942); Acta Chem. Scand. 3, 1117 (1949); J. Amer. Chem. Soc. 83, 3808 (1961); J. Chem. Soc. Perkin I, 2479 (1992)]. The disadvantage of this oxidative method is that it proceeds reasonably satisfactorily only in the absence of oxidation-sensitive substituents.

Furthermore, phenols can be reacted first with aluminium trichloride, then with chloral, and the resulting product is dehydrochlorinated with aluminium oxide in decalin [Tetrahedron 39/13, 2147 (1983)]. Disadvantages of this method are the unsatisfactorily low yield and the production of a major quantity of solid chemical wastes which are difficult to dispose of. In addition, it was found that alkyl groups ortho to the phenol group are partly detached, so that the desired product is not obtained in the desired purity.

In individual cases, it is also possible to use other methods, for example the self-condensation of phenanthrenequinone in the presence of pyridine and acetic anhydride in the dark at room temperature, the pyrolysis of bis-2-keto-3-acetyl-4,5:6,7dibenzocoumar-3-yl, the oxidation of ethyl (10-acetoxyphenanthren-9-yl)acetate with pyridinium hydrobromide perbromide, the oxidative rearrangement of benzofuranylidenones with DDQ and water in dioxane [J. Amer. Chem. Soc. 83, 3808 (1961); J. Org. Chem. 47, 1095 (1982);

J. Chem. Soc. Perkin I, 2479 (1992)π, the hydrolysis of the corresponding bisorthoesters obtainable from oxaphosphetanes [Chem. Ber. 113, 2950 (1980)] or the condensation of dehydrooxoperezinone with acetic anhydride [Rev. Latinoam. Quim. 22/1–2, 7 (1991)]. However, these methods cannot be generalized, and the chemicals to be used are costly or hazardous on an industrial scale.

Of course, many isoxindigos can also be prepared from other isoxindigos by chemically modifying their substituents as functional groups without changing the basic isoxindigo structure. The person of ordinary skill in the art knows numerous methods whereby substituents can be converted into other substituents, for example those disclosed in the series "Compendium of Organic Synthetic Methods" (Wiley & Sons, New York, ab 1971). Advantageous reaction conditions are reaction conditions where the known reactivity of the isoxindigo makes it unlikely that its lactone bonds will be cleaved or its double bond reduced. Depending on the nature of their substituents, the compounds of the formula (I) can be used for preparing novel isoxindigos of the formula (I). For example, novel ester or amide derivatives can be prepared by commonly known synthetic methods for the manufacturing of esters or amides as described for example in Organic Syntheses, Collective Vol. I–VII. Preference is given especially to esters prepared by esterification or transesterification of compounds of the formula (I) for example with diverse alcohols under commonly known synthesis and catalysis conditions, for example at temperatures of 0° C. to 200° C., at alcohol quantities of 2 to 200 equivalents based on one equivalent of the compound of the formula (I), in the presence or absence of a solvent.

It has now been found that, surprisingly, the compounds of the formula (I) are obtainable in particularly good yield and purity by starting from 3-hydroxybenzofuranone. This method is mild and economical, and the product can be directly useful as colorant.

The invention therefore also provides a process for preparing a compound of the formula:

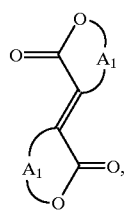

(VIII)

or a mixture consisting of the compounds of the formulae:

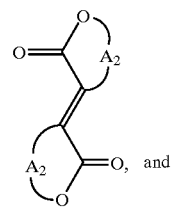

(IX)

(X)

where $A_1$ and $A_2$ are independently unsubstituted or monosubstituted, disubstituted, trisubstituted or tetrasubstituted o-$C_6$–$C_{18}$arylene, by dehydrating a compound of the formula:

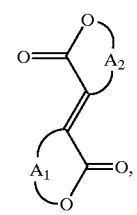

(XI)

or a mixture of compounds of the formulae:

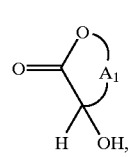

(XII)

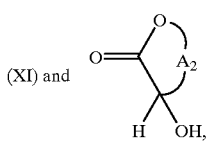

or tautomers thereof.

The compounds of the formulae (XI) and (XII) and their tautomers are known from U.S. Pat. No. 5,614,572. It is not necessary to isolate the compound of the formulae (XI) and (XII); on the contrary, the reaction mixture as obtained in U.S. Pat. No. 5,614,572 can advantageously be further reacted directly. 1 mol of (XI) or of the mixture comprising (XI) and (XII) is theoretically converted into ½ a mol of (VIII) or ½ a mol of the mixture comprising (IX) and (X).

The dehydration can be effected thermally, for example at 80 to 350° C., preferably at 100 to 200° C., in an inert solvent, optionally in the presence of a protic mineral or organic acid, of a Lewis acid or of an acidic earth, for example fulcate, montmorillonite, ion exchanger. The amount of acid is not critical, since it only acts as a catalyst to speed up the elimination of water. In general, a sufficient amount of acid is within the range from 0.01 to 250 mol %, preferably 1 to 10 mol %, based on the compound of the formula (XI) or on the total moles of (XI) or (XII). The dehydration is preferably carried out by removing water azeotropically from the reaction mixture into a water separator with vigorous stirring and refluxing, optionally under reduced or superatmospheric pressure.

The dehydration can also be effected chemically, in which case the compound of the formula (XI) is reacted with an equimolar amount of an electrophilic reagent and then an acid is eliminated from the resulting product, for example at −20 to 250° C., preferably at 50 to 200° C., in an inert solvent, optionally in the presence of an organic base (for example triethylamine, dialkylaniline, for example dimethylaniline, diethylaniline or 1,8-diazabicyclo[5.4.0]undec-7-ene, DBU, 1,4-diazabicyclo[2.2.2]octane, DABCO, pyridine, alkylpyridines, for example methylpyridine, ethylpyridine or 4-dimethylaminopyridine, DMAP or quinoline). The amount of base is not critical, if an acid to be eliminated is volatile under the elimination conditions(hydrogen chloride, for example). In general, an amount of 0.01 to 250 mol %, preferably from 0.1 to 50 mol %, based on the compound of formula (XI), will then be sufficient. If, by contrast, the acid to be eliminated is not volatile under the elimination conditions, it is advantageous to use not less than 100 mol % of base, based on the compound of the formula (XI). This makes it possible to eliminate the acid even at a lower temperature.

Suitable electrophilic reagents are, for example, methyl and ethyl esters of mineral acids, such as dimethyl sulfate or dimethyl phosphonate, or organic or inorganic acid chlorides, such as thionyl chloride, phosgene, methanesulfochloride, mesyl chloride, tosyl chloride or acetyl chloride, or anhydrides, such as acetic anhydride. The person of ordinary skill in the art will effortlessly identify further suitable electrophilic reagents. Whether a stable ester is formed or, as for example in the case of thionyl chloride, the reaction immediately continues, is immaterial for the above-described process, as long as an acid can be eliminated from the product which is formed. Thionyl chloride is the preferred electrophilic reagent.

The present invention further relates to a process for preparing the compounds of the formula:

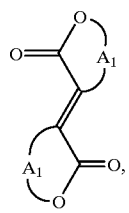

(VIII)

or a mixture consisting of the compounds of the formulae

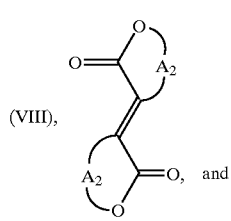

(VIII), (IX)

and

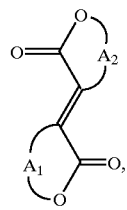

(X)

where $A_1$ and $A_2$ are independently unsubstituted or monosubstituted, disubstituted, trisubstituted or tetra-substituted o-$C_6$–$C_{18}$arylene by
a) reacting a compound of the formula (XIII),
or
b) a mixture of the compounds of the formulae:

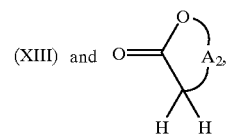

(XIII) and (XL)

with
c) a halogenating agent to form a compound of the formula (XLI):

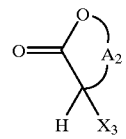

(XLI)

and/or

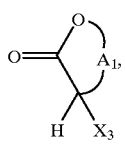

(XLII)

where
$X_{hd\,3}$ is halogen such as iodine, bromine or chlorine, preferably bromine or chlorine, and
d) simultaneously or subsequently, preferably subsequently, dimerizing at a temperature within the range from −20 to 250° C., preferably at 50 to 200° C., to form a compound of the formula (VIII), (IX) and/or (X).

The reaction with a halogenating agent is generally carried out by commonly known methods, for example by the method of direct halogenation described in U.S. Pat. No. 5,614,572.

According to the process of the invention, it is possible initially to isolate the halogenated compound of the formula (XLI) or (XLII) and then to dimerize it at a temperature within the range from −20 to 250° C., preferably at 50 to 200° C., to form a compound of the formula (VIII), (IX) or (X), or to dimerize directly without isolating the halogenated compound of the formula (XLI) or (XLII) or the mixtures thereof.

Preference is given to dimerizing without isolating the halogenated compound (XLI) or (XLII).

Suitable halogenating agents are, for example iodine, bromine, chlorine, N-chlorosuccinimide, N-bromosuccinimide, preference being given to Br$_2$.

The molar ratio of the compound of the formula (XIII) and (XL) is customarily within the range from 1:100 to 100:1.

In general, the halogenation can be carried out in an inert solvent at a temperature within the range from −20° C. to 150°C., preferably at 20 to 80° C., in the course of 5 minutes to 20 hours.

The weight ratio of the compound of the formula (XIII) and (XL) or of the halogenated compounds of the formulae (XLI) and (XLII) to the solvent is generally within the range from 1:100 to 100:1.

The inert solvent used is generally, for example, an ether such as tetrahydrofuran, dioxane, diethyl ether or a $C_5$–$C_{12}$alkane such as pentane, hexane, heptane, octane, nonane, decane, undecane, dodecane or a $C_5$–$C_{12}$cycloalkane such as cyclopentane, cyclohexane, cycloheptane, cyclooctane, cyclononane, cyclodecane or cyclododecane or especially a halogenated alkane such as dichloromethane, trichloromethane, tetrachloromethane, dichloroethane, dichloroethylene, trichloroethane or tetrachloroethane or an aryl which is benzene, ortho-dichlorobenzene or toluene.

The dimerization is preferably carried out in an inert solvent which generally conforms to the above-specified definition.

If desired, the halogenation, synthesis step c), and/or the dimerization, synthesis step d), can be carried out in the presence of an organic base such as, for example, triethylamine, dialkylaniline such as, for example, dimethylaniline, diethylaniline or 1,8-diazabicyclo[5.4.0]-undec-7-ene, DBU, 1,4-diazabicyclo[2.2.2]octane, DABCO, pyridine, alkylpyridines such as, for example, methylpyridine, ethylpyridine or 4-dimethylaminopyridine, DMAP or quinoline. The amount of base is not critical. In general, an amount of 0.01 to 250 mol %, preferably 0.1 to 50 mol %, based on the compound of the formula (XIII) or (XL) or (XLI) or (XLII), will be sufficient.

If desired, if low temperatures are to be used for the dimerization, it is advantageous to use not less than 100 mol % of base, based on the compound of the formula (XIII) or (XL) or (XLI) or (XLII).

The isolation of the halogenated compound (XLI) or (XLII) or of the dimers (VIII), (IX) or (X) or mixtures thereof is effected by methods which come under the common general knowledge of the person already skilled in the art. It is customary, for example, to wash the organic phase comprising the reaction product with water and then to concentrate the organic phase, preferably to dryness. In a further variant of the work-up, the organic reaction product can also be evaporated directly and subsequently purified, for example by recrystallization or column chromatography. For a recrystallization, the isolation is customarily effected by filtration and subsequent washing of the filter residue with preferably a solvent in which the reaction product is only sparingly soluble. The column-chromatographed organic phase comprising the reaction product can be evaporated directly. If desired, the reaction products can be dried after isolation. Drying is generally accomplished using a commonly known drying apparatus such as drying cabinets or paddle dryers.

A particular embodiment of the process of the present invention concerns the controlled preparation of the asymmetrical compounds of the formula (X) by reacting a compound of the formula (XIII) with a halogenating agent to form a compound of the formula (XLI):

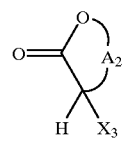

(XLI)

and dimerizing this product at a temperature within the range from −20 to 250° C., preferably at 50 to 200°C., with a compound of the formula:

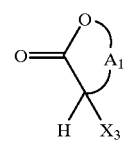

(XLII)

Depending on the nature of their substituents and on that of the polymer to be coloured, the compounds of the formula (I), (VII) or (IIb) or of the compositions of the invention can be used as polymer-soluble dyes or as pigments. In the latter case it is advantageous to convert the as-synthesized products into a finely divided form. This can be accomplished in a conventional manner. Depending on the compound and intended purpose, it is advantageous to use the colorants as toners or in the form of preparations.

The compound of the formula (I), (VII) or (IIb) is advantageously used in an amount of 0.01 to 70% by weight, customarily 0.01 to 30% by weight, preferably 0.01 to 10% by weight, based on the high molecular weight organic material to be coloured.

The invention accordingly further provides a composition of matter comprising a high molecular weight organic material and at least one compound of the formula (I), (VII) or (IIb) or a composition consisting of compounds of the formula (I) or (VII) and/or (IIb) in a colouristically effective amount, in general within the range from 0.01 to 70% by weight, especially from 0.01 to 30% by weight, preferably from 0.01 to 10% by weight, based on the high molecular weight organic material.

The present invention further relates to the individual use of the compounds of the formula (I), (VII) or (IIb) as colorants, especially for colouring or pigmenting high molecular weight organic or inorganic material. However, it is likewise possible to use the inventive compositions comprising compounds of the formula (I), (VII) or (IIb) as mixtures, solid solutions or mixed crystals. Compounds of the formula (I), (VII) or (IIb) can also be combined with colorants of another chemical class, for example with dyes or pigments as, for example, selected from the group of the diketopyrrolopyrroles, quinacridones, perylenes, dioxazines, anthraquinones, indanthrones, flavanthrones, indigos, thioindigos, quinophthalones, isoindolinones, isoindolines, phthalocyanines, metal complexes, azo pigments and azo dyes.

Depending on the nature of their substituents and on that of the polymer to be coloured, the compounds of the formula (I), (VII) or (IIb) can be used as polymer-soluble dyes or as pigments. In the latter case it is advantageous to convert the as-synthesized products into a finely divided form. This can be accomplished in a conventional manner. Depending on the compound and intended purpose, it is advantageous to use the colorants as toners or in the form of preparations.

The high molecular weight materials can be organic or inorganic and can be synthetic and/or natural substances. They can be, for example, natural resins or drying oils, rubber or casein or modified natural substances such as chloro rubber, oil-modified alkyd resins, viscose, cellulose ethers or esters such as ethylcellulose, cellulose acetate, propionate or butyrate, cellulose acetate butyrate and nitrocellulose, but especially wholly synthetic organic polymers (thermosets and thermoplastics) as can be obtained by polymerization, for example by polycondensation or polyaddition. The class of the polymers includes, for example, polyolefins such as polyethylene, polypropylene, polyisobutylene, substituted polyolefins such as polymers from monomers such as vinyl chloride, vinyl acetate, styrene, acrylonitrile, acrylic esters, methacrylic esters, fluorine polymers, for example polyfluoroethylene, polytrifluorochloroethylene or tetrafluoroethylene/hexafluoropropylene interpolymer, and also copolymers of the monomers mentioned, especially ABS (acrylonitrile/butadiene/styrene) or EVA (ethylene/vinyl acetate). Exemplary polyaddition and polycondensation resins which can be used are condensation products of formaldehyde with phenols, known as phenolics, and condensation products of formaldehyde and urea or thiourea, also melamine, known as aminoplasts, also the polyesters used as surface-coating resins, either saturated such as alkyd resins or unsaturated such as maleic resins, also linear polyesters, polyamides, polyurethanes, polycarbonates, polyphenylene oxides, silicones or silicone resins.

The high molecular weight compounds mentioned can be present individually or in mixtures as plastically deformable materials or melts or in the form of spinning solutions. They can also be present in the form of their monomers or in the polymerized state in dissolved form as film-formers or binders for paints or printing inks, for example linseed oil varnish, nitrocellulose, alkyd resins, melamine resins and urea-formaldehyde resins or acrylic resins.

The present invention accordingly further provides for the use of the inventive compositions consisting of compounds of the formula (I) or (VII) and/or (IIb) or compounds of the formula (I), (VII) or (IIb), for preparing inks, for printing inks in printing processes, for flexographic printing, screen printing, packaging printing, security colour printing, intaglio printing or offset printing, for print precursors and also for textile printing, for office applications, home applications or graphic applications such as, for example, for paper goods, for ballpoint pens, felt-tip pens, fibre-tip pens, paperboard, wood, (wood) stains, metal, stamp pads or inks for impact printing processes (involving impact printing colour ribbons), for preparing colorants, for coatings, for industrial or commercial use, for textile decoration and for industrial marking, for roll coatings or powder coatings or for automotive coatings, for high solids (low solvent), aqueous or metallic coatings or for pigmented formulations for aqueous paints, for mineral oils, greases or waxes, for preparing coloured plastics for coatings, fibres, platters or mould carriers, for preparing non-impact printing material for digital printing, for the thermal wax transfer printing process, the ink jet printing process or for the thermal transfer printing process, also for preparing colour filters, especially for visible light within the range from 400 to 700 nm, for liquid crystal displays (LCDs) or charge coupled devices (CCDs) or for preparing cosmetics or for preparing polymeric colour particles, toners, dry copy toners, liquid copy toners or electrophotographic toners.

The present invention further relates to inks comprising high molecular weight organic material and a colouristically effective amount of compound (I), (VII) or (IIb) or of the composition consisting of compounds of the formula (I) or (VII) and/or (IIb).

Processes for preparing inks, especially for ink jet printing, form part of the common general knowledge and are described, for example, in U.S. Pat. No. 5,106,412.

The inks can be prepared, for example, by mixing the compounds of the invention with polymeric dispersants.

The mixing of the compounds of the invention with the polymeric dispersant is preferably effected by commonly known methods of mixing such as stirring or blending, the use of high intensity blenders such as Ultraturax being advisable for preference.

To mix the compounds of the invention with polymeric dispersants, it is advantageous to use a water-thinnable organic solvent.

It is advantageous to select a weight ratio for the compounds of the invention to the ink which is within the range from 0.0001 to 75% by weight, preferably within the range from 0.001 to 50% by weight, based on the total weight of the ink.

The present invention therefore also provides a process for preparing inks by mixing a high molecular weight organic material with a colouristically effective amount of the compound (I), (VII) or (IIb) or the compositions consisting of compounds of the formula (I) or (VII) and/or (IIb).

The present invention further provides colorants comprising high molecular weight organic material and a colouristically effective amount of a compound (I), (VII) or (IIb) according to the invention or of a composition according to the invention.

The present invention yet further provides a process for preparing colorants by mixing a high molecular weight organic material and a colouristically effective amount of the compound (I) according to the invention or of the composition of the invention, consisting of compounds of the formula (I) or (VIII) and/or (IIb).

The present invention further provides coloured plastics or polymeric colour particles comprising high molecular weight organic material and compound (I), (VII) or (IIb) or a composition consisting of compounds of the formula (I) or (VII) and/or (IIb) in a colouristically effective amount.

The present invention additionally provides a process for preparing coloured plastics or polymeric colour particles by mixing a high molecular weight organic material and a colouristically effective amount of compound (I), (VII) or (IIb) or a composition consisting of compounds of the formula (I) or (VIII) and/or (IIb).

The high molecular weight organic substances are coloured with the colorants of the formula (1), (VII) or (IIb), or the compositions comprising compounds of the formula (I) or (VII) and/or (IIb), for example by mixing such a colorant, optionally in the form of master batches, into these substrates using roll mills, mixing or grinding apparatus to dissolve or finely disperse the colorant in the high molecular weight material. The high molecular weight organic material with the admixed colorant is subsequently processed in a conventional manner, for example by calendering, pressing, extruding, coating, spinning, casting or injection moulding, whereby the coloured material acquires its ultimate shape. The mixing in of the colorant can also be effected directly prior to the actual processing step, for example by continuously metering a pulverulent colorant of this invention and a granulated high molecular weight organic material and also, optionally, additional substances such as, for example, additives, simultaneously directly into the inlet zone of an extruder where the mixing in takes place just prior to the processing. In general, however, prior mixing of the colorant into the high molecular weight organic material is preferable, since more uniform results can be obtained.

It is frequently desired to incorporate plasticizers into the high molecular weight compounds prior to shaping to produce non-rigid mouldings or to reduce their brittleness. Examples of useful plasticizers are esters of phosphoric acid, phthalic acid or sebacic acid. In the process of the present invention, plasticizers can be incorporated into the polymers before or after the colorant has been incorporated. It is further possible, for the purpose of achieving different hues, to add to the high molecular weight organic substances not only the compounds of the formula (I), (VII) or (IIb), or the compositions of the invention, but also constituents such as white, colour or black pigments in any desired quantities.

To colour paints and printing inks, the high molecular weight organic materials and the compounds of the formula (I), (VII) or (IIb), or compositions of the invention, optionally together with additional substances such as fillers, dyes, pigments, siccatives or plasticizers, are finely dispersed or dissolved in a common organic solvent or solvent mixture. This can be accomplished by dispersing or dissolving the individual components by themselves or else more than one together and only then to combine all the components. Processing is effected in a conventional manner, for example by spraying, cast-coating or one of the many printing methods, whereupon the paint or the printing ink, if necessary after prior drying, is advantageously thermally or radiation cured.

If the high molecular weight material to be coloured is a paint, it can be a standard paint or else a speciality paint, for example an automotive paint, preferably a metallic effect paint comprising, for example, metal or mica particles.

Preference is given to the coloration of thermoplastic materials, including in particular in the form of fibres, and also of printing inks. Preferred high molecular weight organic materials useful for coloration according to this invention are generally polymers having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) or acrylonitrile/butadiene/styrene (ABS). Particular preference is given to polyester, polycarbonate, polystyrene and PMMA. Very particular preference is given to polyester, polycarbonate or PMMA, especially aromatic polyesters obtainable by polycondensation of terephthalic acid, e.g. polyethylene terephthalate (PET) or polybutylene terephtharate (PBTP).

Particular preference is further given to the colouring of mineral oils, greases and waxes with the compounds of the invention.

The present invention also provides non-impact printing material comprising high molecular weight organic material and a compound (I), (VII) or (IIb) or composition consisting of compounds of the formula (I) or (VII) and/or (IIb) in a colouristically effective amount.

The present invention also provides a process for preparing non-impact printing material by mixing a high molecular weight organic material and a colouristically effective amount of the compound (I), (VII) or (IIb) or composition consisting of compounds of the formula (I) or (VII) and/or (IIb).

The present invention further provides a process for preparing colour filters comprising a transparent substrate and, applied thereto, a red, blue and green layer in any desired order by preparing the red, blue and green layers using in each case an appropriately coloured compound (I), (VII) or (IIb) or composition consisting of compounds of the formula (I) or (VII) and/or (IIb).

The differently coloured layers preferably have such patterns that they do not overlap on not less than 5% of their respective areas and most preferably do not overlap at all.

The colour filters can for example be co ate d using inks, especially printing inks, comprising the compounds or compositions of the invention, or be prepared, for example, by mixing a compound or compositions according to the invention with chemically, thermally or photolytically structurable high molecular weight material (resist). Further preparation can be effected for example similarly to EP-A 654 711 by application to a substrate, such as an LCD, subsequent photostructuring and development.

The invention further encompasses a transparent substrate coated with a red layer, a blue layer and a green layer each comprising an appropriately coloured compound (I) or a composition consisting of compounds of the formula (I) or (VII) and/or (IIb) comprising pigmented high molecular weight organic material. The order in which the layers are applied is generally immaterial. The differently coloured layers preferably have such patters that they do not overlap on not less than 5% of their respective areas and most preferably do not overlap at all.

The present invention further encompasses colour filters comprising a transparent substrate and, applied thereto, a red layer, a blue layer and a green layer, each obtainable from an appropriately coloured compound (I), (VII) or (IIb) or a composition consisting of compounds of the formula (I) or (VII) and/or (IIb).

The present invention additionally provides toners comprising high molecular weight organic material and a compound (I), (VII) or (IIb) or composition consisting of compounds of the formula (I) or (VII) and/or (IIb) in a colouristically effective a mount.

The present invention also provides processes for preparing toners by mixing a high molecular weight organic material and a colouristically effective amount of compound (I), (VII) or (IIb) or composition consistings of compounds of the formula (I) or (VII) and/or (IIb).

In a particular embodiment of the process of the invention, toners, coatings, inks or coloured plastics are prepared by processing master batches of toners, coatings, inks or coloured plastics in roll mills, mixing or grinding apparatus.

For the purposes of the present invention, a colouristically effective amount of compound (I), (VII) or (IIb) or composition consisting of compounds of the formula (I) or (VII) and/or (IIb) is generally within the range from 0.0001 to 99.99% by weight, preferably within the range from 0.001 to 50% by weight, particularly preferably within the range from 0.01 to 50% by weight, based on the total weight of the material coloured or pigmented therewith.

When the compounds of the formula (I), (VII) or (IIb), or of the compositions of the invention, are present in a dissolved state in the polymers used, they are notable for a clean hue, high colour strength, high lightfastness and weatherfastness, especially for PET, PMMA, PS and PC, and also high fluoresence. The colours obtained, effect example in thermoplastic or thermoset materials, fibres, paints or coatings, are notable for a clean hue, high colour strength, high saturation, high transparency, good fastness to overtpraying, migration, rubbing, light, weathering and especially heat, and good gloss. The colorants have good dispersibility and generally good solubilities in organic solvents. They are useful in solar energy collectors and for generating laser beams. Mixtures comprising the compounds of this invention have attractive hues. Particularly advantageously, asymmetrical isoxindigos and also bisisoxindigos offer further hoes and make it possible to vary their solubility via the choice of substituents.

The examples hereinbelow elucidate the invention without restricting it in any way:

Example 1A

A 1.5 I multi-neck flask equipped with stirrer, dropping funnel, water separator, condenser and thermometer is charged with 300 ml of toluene, 212 g of 97% 2,4-di-tert-butylphenol, 121.9 ml of 50% aqueous glyoxylic acid and 0.5 g of p-toluenesulfonic acid monohydrate added in succession with stirring. The reaction mixture is then vigorously refluxed with thorough stirring. The water present in the glyoxylic acid and the water of reaction formed in the first stage collect in the water separator. After a reflux time of about 3 h the removal of water ceases, leaving a homogeneous, slightly yellow solution of the hydroxybenzofuranone.

The reaction mixture is then diluted with 40 ml of a linear $C_9$–$C_{13}$alkylbenzene ('®Marlican, Hüls) boiling at 275–312° C. Thereafter, about 200 ml of toluene are distilled off at atmospheric pressure and a heating bath temperature of up to 142° C. At the end of the distillation the internal temperature is about 121° C. The pale yellow oily mixture is cooled down to an internal temperature of about 60° C. and admixed with 13.9 ml of triethylamine. Thereafter 79.8 ml of thionyl chloride are added dropwise from the dropping funnel at such a rate that the evolution of HCl and $SO_2$ remains lively but still controllable. The addition takes about 75 min, the internal temperature is 60–67° C. After gas formation has virtually ceased, the reaction mixture is stirred at 100° C. for a further 1 hour.

The heating controller of the heating bath is then set to 200° C. The temperature of the reaction mixture rises to 186° C. in the course of about 35 min, while a further 105 ml of toluene distill off. At the same time, there is again a lively stream of escaping HCl gas. If gas evolution is too vigorous, the heating rate is appropriately reduced. The already deep red mixture is subsequently stirred at 180–190° C. for a further 2 h. The thick, dark red to black crystal suspension is cooled down to about 150° C.; 200 ml of n-butanol are then added via the condenser, followed by 400 ml of ethanol. The crystal suspension is stirred under reflux for about 1 h more, then cooled down to 0–5° C. and filtered. The crystal cake is washed with sufficient cold ethanol (about 600 ml) until the filtrate is clear and no longer brownish, but faintly red. The crystalline dye is subsequently dried at 80° C./50 mbar to obtain 186.2 g (76.2% of theory, based on 2,4-di-tert-butylphenol) of fine shiny deep red crystals of 5,7,5', 7'-tetra-tert-butyl[3,3'] bibenzofuranylidene-2,2'-dione of the formula:

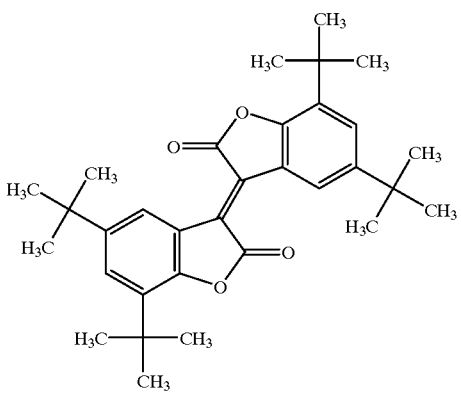

(XV)

| Melting point: | 254–256° C.; |  |  |
|---|---|---|---|
| Elemental analysis: |  | % C | % H |
|  | calc. | 78.65 | 8.25 |
|  | obs. | 78.40 | 8.39 |

EXAMPLE 1B 10 g of 5,7-di-tert-butyl-3-hydroxy-3H-benzofuran-2-one (prepared as described in Example 1 of U.S. Pat. No. 5,614,572) are introduced in 25 ml of 1,2-dichlorobenzene as initial charge and admixed with 0.5 g of 4-dimethylaminopyridine and 3 ml of thionyl chloride. The solution is then gradually heated to 100° C. so that the evolution of HCl and $SO_2$ remains lively, but still controllable. Thereafter the reaction mixture is stirred at 100° C. for a further ½ h. The temperature is subsequently raised to the reflux point. After 75 min, the 1,2-dichlorobenzene is distilled off, at the end with reduced pressure. The isoxindigo is crystallized out by the addition of 30 ml of acetonitrile to the residue, filtered off, washed with acetonitrile and dried to leave 6.8 g (73% of theory) of 5,7,5',7'-tetra-tert-butyl[3,3'] bibenzofuranylidene-2,2'-dione of the formula (XV).

EXAMPLE 1C 78.7 g of 5,7-di-tert-butyl-3-hydroxy-3H-benzofuran-2-one (prepared as in Example 1B) are introduced in 150 ml of toluene as initial charge and admixed with 3 drops of dimethylformamide (DMF) and 45 ml of thionyl chloride. The solution is then gradually heated to 100° C. so that the evolution of HCl and $SO_2$ remains lively but still controllable. Thereafter the reaction mixture is stirred at this temperature for a further 1 h. About 150 ml of liquid are subsequently distilled off to remove excess thionyl chloride. The residue is diluted with 480 ml of toluene and admixed at room temperature with 42 ml of triethylamine added dropwise. The thick red reaction mixture is then refluxed for 15 min. The precipitated triethylamine hydrochloride is filtered off after cooling down to room temperature, the filtrate is washed with water and concentrated NaCl solution and concentrated in a rotary evaporator to an oily consistency. The isoxindigo is crystallized out by addition of 225 ml of acetonitrile, filtered off, washed with acetonitrile and dried to leave 57.7 g (78.7% of theory) of 5,7,5',7'-tetra-tert-butyl[3,3']bibenzofuranylidene-2,2'-dione of the formula (XV).

EXAMPLE 1D 12.9 g of 5,7-di-tert-butylbenzofuran-2-one (prepared similarly to H. -D. Becker, K. Gustaffson, J. Org. Chem. 42, 2966 (1977)) are introduced in 50 ml of 1,2-dichlorobenzene as initial charge and admixed with 1 ml of triethylamine and subsequently with 2.83 ml of bromine. The solution is then heated to 60° C., and HBr evolves. After 2.5 hours and the dropwise addition of 1 ml of triethylamine, the temperature is gradually raised to 165° C. After a further 2.5 h the reaction mixture is cooled down and washed with water, dried and concentrated in a rotary evaporator to an oily consistency. The isoxindigo crystallizes out on addition of 150 ml of methanol, and is filtered off, washed and dried and obtained in an amount of 7.96 g (62% of theory).

Example 2A 22 g of 7-tert-butyl-3-hydroxy-5-methyl-3H-benzofuran-2-one (prepared as described in Example 2 of U.S. Pat. No. 5,614,572) are introduced in 50 ml of toluene as initial charge and admixed with 3 drops of DMF and 15 ml of thionyl chloride. The solution is then gradually heated to 100° C. so that the evolution of HCl and $SO_2$ remains lively but still controllable. Thereafter the reaction mixture is stirred at 100° C. for a further 1 h. About 50 ml of liquid are subsequently distilled off to remove excess thionyl chloride. The residue is diluted with 160 ml of toluene and admixed at room temperature with 14 ml of triethylamine added dropwise. The thick red reaction mixture is then refluxed for 30 min. The precipitated triethylamine hydrochloride is filtered off after cooling to room temperature and the residue is concentrated in a rotary evaporator to an oily consistency. The isoxindigo is crystallized out by addition of 200 ml of acetonitrile, filtered off, washed with acetonitrile and dried to leave 11.6 g (57% of theory) of 7,7'-di-tert-butyl-5,5'-dimethyl[3,3']bibenzofuranylidene-2,2'-dione of the formula:

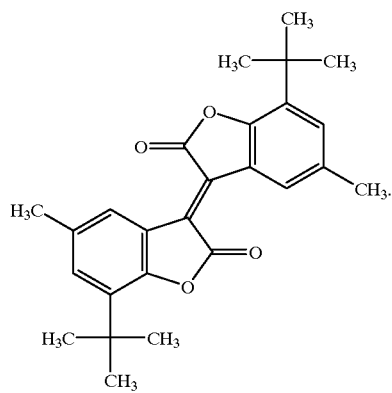

(XVI)

Melting point: 253–255° C.;
$^1$H NMR (CDCl$_3$, 300 MHz), δ[ppm]: 1.43 s/9H, 2.41 s/3H, 7.26 s/1H, 8.72 s/1H.

EXAMPLE 2B 2.2 g of 7-tert-butyl-3-hydroxy-5-methyl-3H-benzofuran-2-one (prepared as in Example 2A) are refluxed for 17 h with 0.23 g of camphor-10-sulfonic acid in 10 ml of 1,2-dichlorobenzene. The red reaction mixture is subsequently diluted with 20 ml of dichloromethane, washed with water and evaporated in a rotary evaporator. The isoxindigo is crystallized out by addition of 15 ml of methanol to the residue, filtered off, washed with methanol and dried to leave 0.77 g (38% of theory) of 7,7'-di-tert-butyl-5,5'-dimethyl-[3,3']bibenzofuranylidene-2,2'-dione of the formula (XVI).

EXAMPLE 2C 2.2 g of 7-tert-butyl-3-hydroxy-5-methyl-3H-benzofuran-2-one (prepared as in Example 2A) are heated for 3 h at 235° C. in a flask equipped with a descending condenser. The red reaction mixture is subsequently cooled down to about 150° C., and the isoxindigo is crystallized out by addition of 10 ml of methanol, filtered off, washed with methanol and dried to leave 0.55 g (27% of theory) of 7,7'-di-tert-butyl-5,5'-dimethyl[3,3']bibenzofuranylidene-2,2'-dione of the formula (XVI).

EXAMPLE 3

7.1 g of 3-hydroxy-5-methyl-7-(1,1,3,3-tetramethylbutyl)-3H-benzofuran-2-one (U.S. Pat. No. 5,614,572, Column 35, Compound N°. 111) are introduced into 12.5 ml of toluene as initial charge and admixed with 3 drops of DMF and 2.7 ml of thionyl chloride. The solution is then gradually heated to 100° C. so that the evolution of HCl and $SO_2$ remains lively but still controllable. Thereafter the reaction mixture is stirred at 100° C. for a further 1 h. About 12 ml of liquid are subsequently distilled off to remove excess thionyl chloride. The residue is diluted with 37.5 ml of toluene and admixed at room temperature with 3.5 ml of triethylamine added dropwise. The thick red reaction mixture is then refluxed for 30 min. The precipitated triethylamine hydrochloride is filtered off after cooling to room temperature and the filtrate is concentrated in a rotary evaporator to an oily consistency. The isoxindigo is crystallized out by addition of 25 ml of acetonitrile, filtered off, washed with acetonitrile and dried to leave 3.45 g (53% of theory) of 5,5'-dimethyl-7,7'-bis(1,1,3,3-tetramethylbutyl)[3,3']bibenzofuranylidene-2,2'-dione of the formula

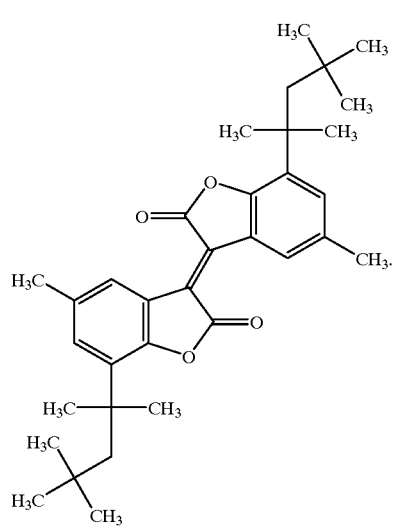

(XVII)

Melting point: 187–190 C.;
$^1$H NMR (CDCl$_3$, 300 MHz), δ[ppm]: 0.75 s/9H, 1.52 s6H, 1.94 s/2H, 2.41 s/3H, 7.27 s/1H, 8.75 s/1H.

EXAMPLE 4

42.7 g of 3-tert-butyl-4-hydroxyanisole are boiled together with 38.5 g of 50% aqueous glyoxylic acid and 0.2 g of p-toluenesulfonic acid in 75 ml of toluene under a water separator for 90 min. The reaction mixture is thereafter admixed at 100° C. with 19 ml of thionyl chloride added dropwise at such a rate that the evolution of HCl and SO$_2$ remains lively, but still controllable. The reaction mixture is subsequently stirred at 100° C. for a further 1 h. 10 ml of ®Marlican and 3.3 ml of triethylamine are then added. The temperature is then raised to 1 800° C. over 30 min while 71 ml of toluene are distilled off. After a further 1.5 h of stirring at 180° C., the reaction mixture is cooled down to 150° C., admixed with 50 ml of n-butanol and thereafter with 100 ml of ethanol, refluxed for 1 h and then stirred at 5° C. to precipitate the isoxindigo, and the precipitated isoxindigo is then filtered off, washed with ethanol and dried to leave 17.2 g (33% of theory) of 7,7'-di-tert-butyl-5,5'-dimethoxay-[3,3']bibenzofuranylidene-2,2'-dione of the formula

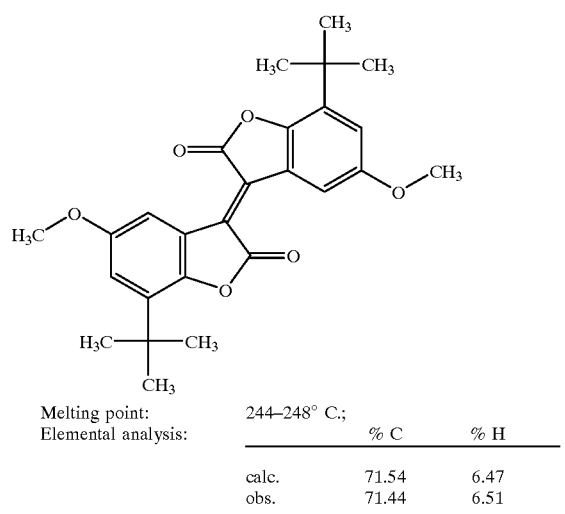

(XVIII)

| Melting point: | 244–248° C.; | |
| --- | --- | --- |
| Elemental analysis: | % C | % H |
| calc. | 71.54 | 6.47 |
| obs. | 71.44 | 6.51 |

EXAMPLE 5

2.8 g of 2-tert-butyl-4-chlorophenol [J. Amer. Chem. Soc. 78, 4604 (1956)] are refluxed for 3¼ h with 2.45 g of 50% aqueous glyoxylic acid and 50 mg of p-toluenesulfonic acid in 20 ml of 1,2-dichloroethane. Thereafter a further 2.45 g of 50% aqueous glyoxylic acid are added to continue refluxing for 18 h. The reaction mixture is then washed with water, dried over MgSO$_4$ and evaporated in a rotary evaporator. Crystallization of the residue from hexane leaves 1.15 g of 7-tert-butyl-5-chloro-3-hydroxy-3H-benzofuran-2-one (melting point: 150–154° C.).

1.1 g of this compound are introduced in 5 ml of toluene with 1 ml of thionyl chloride as initial charge and then gradually heated to 100° C. so that the evolution of HCl and SO$_2$ remains lively, but still controllable. The reaction mixture is subsequently stirred at 100° C. for a further 1.1 h. About 5 ml of liquid are subsequently distilled off to remove excess thionyl chloride. The residue is diluted with 13 ml of toluene and admixed at room temperature with 0.6 ml of triethylamine added dropwise. The thick red reaction mixture is then heated to reflux and refluxed for 45 min. The precipitated isoxindigo is filtered off after cooling down to room temperature, freed of triethylamine hydrochloride by washing with water and methanol and dried to leave 0.47 g (46% of theory) of 7,7'-di-tert-butyl-5,5'-dichloro[3,3']bibenzofuranylidene-2,2'-dione of the formulas:

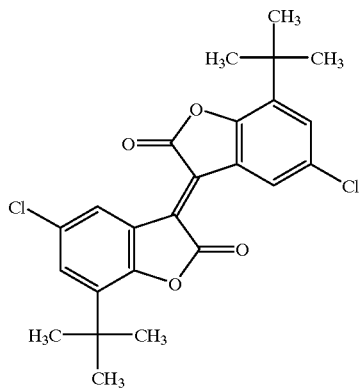

(XIX)

| Melting point: | above 300° C.; | |
| --- | --- | --- |
| Elemental analysis: | % C | % H |
| calc. | 64.73 | 4.98 |
| obs. | 64.59 | 4.96 |

EXAMPLE 6

32.5 g of 2,6-di-tert-butyl-4-phenylsulfonylphenol [Org. Chem. 38, 687 (1973)] are melted at 120° C. together with 1.2 g of camphor-2-sulfonic acid. A slow stream of nitrogen (~1 ml/min) is subsequently passed through the stirred melt for 29 h. The reaction mixture is thereafter diluted with toluene, washed with water and evaporated in a rotary evaporator. The residue is column chromatographed over silica gel (hexane:ethyl acetate 19:1) to recover 10.8 g of oily 2-tert-butyl-4-phenylsulfanylphenol.

This oil is refluxed for 24 h with 6.84 g of 50% aqueous glyoxylic acid and 50 mg of p-toluenesulfonic acid in 40 ml of 1,2-dichloroethane. Thereafter a further 4 g of 50% aqueous glyoxylic acid are added to continue the refluxing for a further 5 h. The reaction mixture is then washed with water, dried over MgSO$_4$ and evaporated in a rotary evaporator. 20 ml of hexane are added to the residue to separate 7-tert-butyl-3-hydroxy-5-phenylsulfanyl-3H-benzofuran-2-one off as a viscous oil, which is removed and dried under reduced pressure (9.3 g).

2.45 g of this viscous oil are introduced in 10 ml of toluene with 1.1 ml of thionyl chloride and 3 drops of DMF as initial charge and then gradually heated to 100° C. so that the evolution of HCl and SO$_2$ remains lively, but still controllable. The reaction mixture is thereafter stirred at 100° C. of liquid are subsequently distilled off to remove excess thionyl chloride. The residue is diluted with 15 ml of toluene and admixed at room temperature with 1.1 ml of triethylamine added dropwise. The thick red reaction mixture is then heated to reflux and refluxed for 45 min. After cooling, 20 ml of water are added. The isoxindigo is isolated by chromatography of the concentrated organic phase over silica gel (hexane:toluene 2:1) to leave 0.53 g (23% of theory) of 7,7'-di-tert-butyl-5,5'-bisphenylsulfanyl[3,3']bibenzofuranylidene-2,2'-dione of the formula:

(XX)

Melting point: 206–212° C.;

Elemental analysis:

| | % C | % H |
|---|---|---|
| calc. | 72.95 | 5.44 |
| obs. | 72.99 | 5.34 |

EXAMPLE 7

23.6 g of methyl 3-(3-tert-butyl-4-hydroxyphenyl) propionate, 10.1 g of glyoxylic acid monohydrate and 0.08 g of p-toluenesulfonic acid are boiled in 80 ml of 1,2-dichloroethane under a water separator for 7 h. The reaction solution is then cooled down, washed 3 times with 50 ml of water each time and freed of solvent in a rotary evaporator to leave 29.2 g of methyl 3-(7-tert-butyl-3-hydroxy-2-oxo-2,3-dihydrobenzofuran-5-yl)propionate in the form of a yellowish oil.

This yellowish oil is introduced in 50 ml of toluene as initial charge together with 15 ml of thionyl chloride and 3 drops of DMF and then gradually heated to 100° C. so that the evolution of HCl and $SO_2$ remains lively, but still controllable. The reaction mixture is then stirred at 100 C. for a further 1 h. About 50 ml of liquid are subsequently distilled off to remove excess thionyl chloride. The residue is diluted with 160 ml of toluene and admixed at room temperature with 14 ml of triethylamine added dropwise. The thick red reaction mixture is then refluxed for 30 min. The precipitated triethylamine hydrochloride is filtered off after cooling down to room temperature, and the filtrate is concentrated to an oily consistency in a rotary evaporator. The isoxindigo is crystallized out by addition of 100 ml of acetonitrile, filtered off, washed with acetonitrile and dried to leave 7.4 g (27% of theory) of methyl 3-[7,7'-di-tert-butyl-5'-(2-methoxycarbonylethyl)-2,2'-dioxo[3,3'] bibenzofuranylidene-5-yl]propionate of the formula:

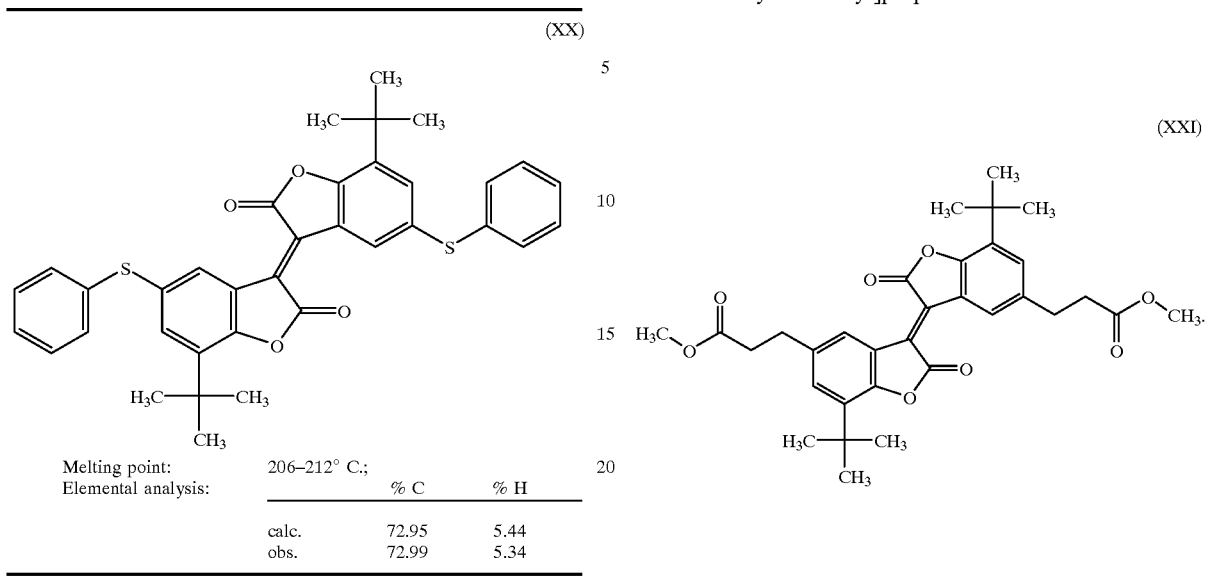

Melting point: 224–226° C.;

$^1$H NMR (CDCl$_3$, 300 MHz), δ[ppm]: 1.43 s/9H, 2.6 t/2H, 3.01 t/2H, 3.70 s/3H, 7.30 d/1 H, 8.77 d/1H, J=1.8 Hz.

Heat stabilities, light fastnesses and migration in engineering plastics (EPL) such as ABS, PC, PMMA or PS

| | | | Heat stability | | Migration | | Light fastness | | |
|---|---|---|---|---|---|---|---|---|---|
| | % Pigment (XXI) | % TiO2 | *GS 4 | **DE 3 | 24 hours/80° C. | Blue scale | 200 hours | 500 hours | 1000 hours |
| PS | 0.20% | | 300 | 300 | 2 | 8 | 5 | 5 | 5 |
| PET | 0.02% | | 300 | 300 | 5 | 8 | 5 | 5 | 5 |

*GS denotes grey scale and is used for the visual quantification of colour differences; the grey scale has 5 levels. GS 4 denotes level 4.
**DE denotes a colorimetric evaluation of colour differences. DE is the sum of all divergences Wet Fastness Wet fastness is determined on a yarn produced on a spinning machine. To this end, 1.00% (weight per cent) of compound (XXI) is mixed with 99.0% (weight per cent) of polyester in an extruder (Collin kneader 25 laboratory extruder) and spun on a laboratory spinning machine (Labspin II, ESL, UK) at 280° C. into a 110 dtex 24 filament yarn.

| Pigment (XXI) | Grey scale | | | |
|---|---|---|---|---|
| concentration 1.00% | | | stains degree° | |
| Test method | changes* | WO | CO | PES |
| Washing (ISO 105-CO6) | 4–5 | 5 | 5 | 5 |

-continued

| Pigment (XXI) | | Grey scale | | | |
|---|---|---|---|---|---|
| concentration 1.00% | | | stains degree° | | |
| Test method | | changes* | WO | CO | PES |
| Hypochlorite fastness ISO 105-N01) | hyppochlorite | 4 | — | — | — |
| Peroxide bleach (ISO-105/N02) | | 4–5 | — | 5 | — |
| Perspiration (ISO 105-E04) | alkaline | 4–5 | 5 | 5 | 5 |
| | acidic | 4–5 | 5 | 5 | 5 |
| Rubbing 30"/180° C. | dry | 4–5 | — | 4–5 | 4–5 |
| | dry after heating | — | — | 4–5 | — |
| Steaming (ISO 105-P02) | | 4–5 | 4–5 | 5 | — |

EXAMPLE 8

7.4 g of the compound of the formula (XXI) according to Example 7 are refluxed for 56 h with 3 ml of methanesulfonic acid in 300 ml of acetic acid. Thereafter 100 ml of acetic acid are distilled off and the residue is poured onto 1200 ml of water. The red precipitate is filtered off, washed with water and dried to leave 7.05 g (~100% of theory) of 3-[7,7'-di-tert-butyl-5'-(2-carboxyethyl)-2,2'dioxo[3,3'] bibenzofuranyliden-5-yl]propionic acid of the formula:

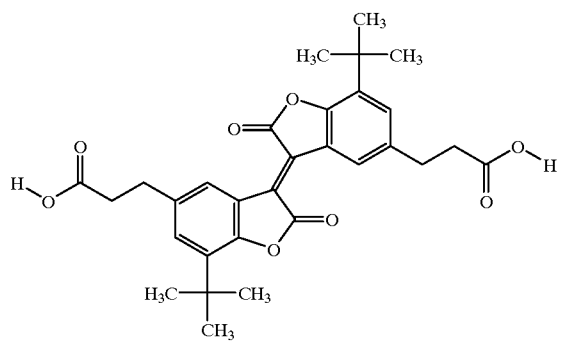

(XXII)

| Melting point: | 289–291° C.; | |
| --- | --- | --- |
| Elemental analysis: | % C | % H |
| calc. | 69.22 | 6.20 |
| obs. | 69.23 | 6.22 |

EXAMPLE 9

18.7 g of 4-tert-butyl-2-(1-methylpentadecyl)phenol, 5.06 g of glyoxylic acid monohydrate and 0.05 g of p-toluenesulfonic acid are heated for 7 h under a water separator in 40 ml of 1,2-dichloroethane. The reaction solution is then cooled down, washed 3 times with 80 ml of water each time and freed of solvent in a rotary evaporator to leave 21.4 g of 5-tert-butyl-3-hydroxy-7-(1-methylpentadecyl)-3H-benzofuran-2one as a yellowish oil. This yellowish oil is introduced in 25 ml of toluene as initial charge together with 8 ml of thionyl chloride and 3 drops of DMF and then gradually heated to 100° C. so that the evolution of HCl and $SO_2$ remains lively, but still controllable. The reaction mixture is then stirred at 100° C. for a further 1 h. About 25 ml of liquid are subsequently distilled off to remove excess thionyl chloride. The residue is diluted with 80 ml of toluene and admixed at room temperature with 7 ml of triethylamine added dropwise. The thick red reaction mixture is then refluxed for 30 min. The precipitated triethylamine hydrochloride is filtered off after cooling down to room temperature, and the filtrate is concentrated to an oily consistency in a rotary evaporator. The residue is chromatographed over silica gel (hexane:ethyl acetate 99:1) to isolate the isoxindigo as a waxy red material, obtaining 4.1 g (20% of theory, based on 4-tert-butyl-2-(1-methylpentadecyl)phenol) of 5,5'-di-tert-butyl-7,7'-bis(1-methylpentadecyl)-[3,3']bibenzofuranylidene-2,2'-dione of the formula:

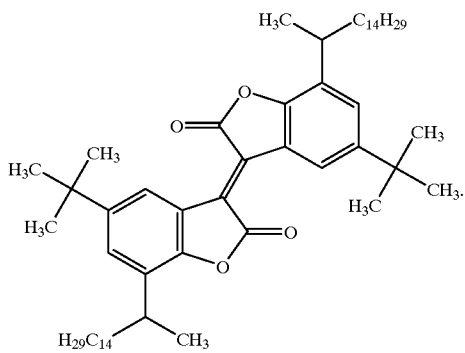

(XXIII)

Melting point: 69–76° C.;

$^1$H NMR (CDCl$_3$, 300 MHz), δ[ppm]: 0.8–1.8 m/32H, 3.03 m/1H, 7.39 d/1H, 9.03 d/1H, J=1.9 Hz.

EXAMPLE 10

7.9 g of 3-hydroxy-5,7-bis(1-methyl-1-phenylethyl)-3H-benzofuran-2-one (U.S. Pat. No. 5,614,572, Column 34, Compound N°. 110) are introduced in 25 ml of toluene as initial charge together with 2 ml of thionyl chloride and 3 drops of DMF and then gradually heated to 100° C. so that the evolution of HCl and $SO_2$ remains lively, but still controllable. The reaction mixture is thereafter stirred at 100° C. for a further 1 h. About 25 ml of liquid are then distilled off to remove excess thionyl chloride. The residue is diluted with 30 ml of toluene and then admixed at room temperature with 2.8 ml of triethylamine added dropwise. The thick red reaction mixture is then refluxed for 30 min. The precipitated triethylamine hydrochloride is filtered off after cooling down to room temperature, and the filtrate is concentrated to an oily consistency in a rotary evaporator. The isoxindigo is isolated from the residue by chromatography over silica gel (toluenelhexane 1:1 to 3:1) and trituration with petroleum spirit, as 3.78 g (51% of theory) of fine red crystals of 5,7,5',7'-tetrakis-(1-methyl-1-phenylethyl)[3,3']bibenzofuranylidene-2,2'-dione of the formula:

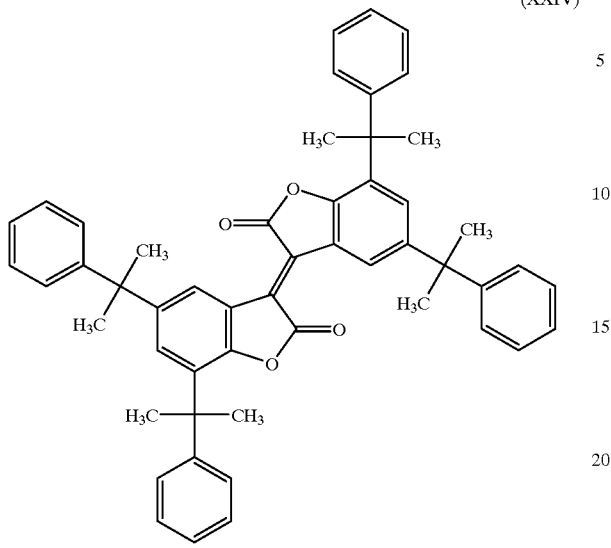

(XXIV)

Melting point: 195–198° C.;
MS (DE-EI): m/e = 536 (M+, C52H48O4).

EXAMPLE 11

4.9 g of 9-hydroxyphenanthrene, 4.1 g of 50% aqueous glyoxylic acid and 0.05 g of p-toluenesulfonic acid are heated for 2 h in 70 ml of 1,2-dichloroethane under a water separator. The precipitated solid is then cooled down, filtered off, washed with cold 1,2-dichloroethane and dried to leave 3.0 g of hydroxybenzofuranone, which is introduced in 20 ml of toluene as initial charge together with 1.5 ml of thionyl chloride and 3 drops of DMF and then gradually heated to 100° C. so that the evolution of HCl and $SO_2$ remains lively, but still controllable. The reaction mixture is subsequently stirred at 100° C. for 1 h. About 20 ml of liquid are then distilled off to remove excess thionyl chloride. The residue is diluted with 10 ml of toluene and admixed at room temperature with 1.7 ml of triethylamine added dropwise. The thick blue reaction mixture is then refluxed for 2 h. The precipitated isoxindigo is filtered off after cooling down to room temperature, freed of the triethylamine hydrochloride by washing with water, dried and recrystallized from dichloromethane/ethanol to leave 1.3 g (47% of theory) of [3,3']bi[1-oxacyclopenta[1]phenanthrenylidene]-2,2'dione of the formula:

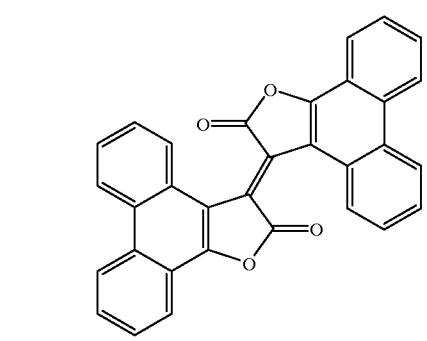

(XXV)

Melting point: above 300° C.;
MS (DE-EI): m/e = 464 (M+, C32H16O4).

EXAMPLE 12

Preparation of Bisisoxindigos a) Preparation of 5,7-di-tert-butyl-3-oxobenzofuranone of the formula

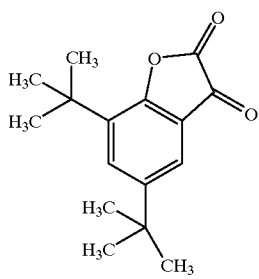

(XXVI)

3.8 g (0.0146 mol) of 5,7-di-tert-butyl-3-hydroxybenzofuranone, 6.1 g (0.032 mol) of p-toluenesulfonic acid and 6.9 g (0.032 mol) of 4-acetaminotetramethylpiperidine oxide are stirred in 100 ml of dichloromethane at room temperature for 24 hours. The yellow solution is then washed three times with 200 ml of 5% hydrochloric acid, dried over magnesium sulfate and evaporated to dryness. Crystallization of the residue from hexane yields 1 g of (XXVI).

Melting point 165–168° C.

b) Preparation of bis(5-cyclohexylidene)-7-tert-butyl-3-oxobenzofuranone of the Formula

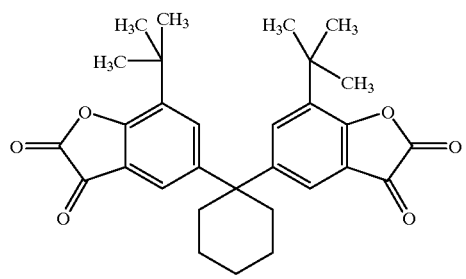

(XXVII)

5.1 g (0.01 mol) of bis(5-cyclohexylidene)-7-tert-butyl-3-hydroxybenzofuranone, 8.75 g (0.046 mol) of p-toluenesulfonic acid and 9.8 g (0.046 mol) of 4-acetaminotetramethyl-piperidine oxide are stirred in 60 ml of dichloromethane at room temperature for 48 hours. The yellow solution is then washed with 50 ml of 5% hydrochloric acid and subsequently four times with 50 ml of water each time, thereafter dried over magnesium sulfate and evaporated. The residue is dissolved in 100 ml of toluene, refluxed for 1 hour and again evaporated to leave 5 g of (XXVII) as an amorphous glass.

c) Preparation of 5-methoxy-7-tert-butylbenzofuranone of the Formula

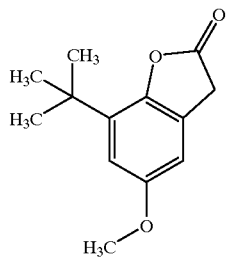

(XXVIII)

This compound is prepared similarly to H. -D. Becker, K. Gustaffsson, J. Org. Chem. 42, 299 (1977). Colourless crystals are obtained.

Melting point 116–118° C.

d) Preparation of Bisisoxindigo of the Formula (XXIX)

4.9 g (0.02 mol) of 5,7-di-tert-butylbenzofuranone (disclosed: H. -D. Becker, K. Gustaffsson, J. Org. Chem. 42, 2966 (1977)), 4.9 g (0.01 mol) of bis(5-cyclohexylidene)-7-tert-butyl-3-oxo-benzofuranone (XXVII) and 0.3 g of p-toluenesulfonic acid are refluxed in 25 ml of acetic acid for 10 hours. Thereafter 125 ml of water are added and the resulting precipitate is filtered off with suction. The filter residue is chromatographed over silica gel (mobile phase: hexane/toluene 2:1). The pure fractions are subsequently recrystallized in methanol and afford 1.25 g of the bisisoxindigo of the formula (XXIX):

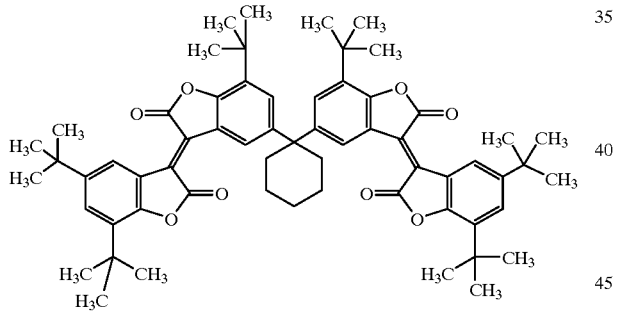

(XXIX)

Melting point: 304–308° C.

e) Preparation of Bisisoxindigo of the Formula (XXX)

22.0 g (0.1 mol) of 5-methoxy-7-tert-butylbenzofuranone (XXVIII), 27.5 g (0.05 mol) of bis(5-cyclohexylidene)-7-tert-butyl-3-oxobenzofuranone (XXVII) and 1 g of p-toluenesulfonic acid are refluxed in 130 ml of acetic acid for 22 hours. Recrystallization from dichloromethane/methanol yields 9.2 g of the compound of the formula:

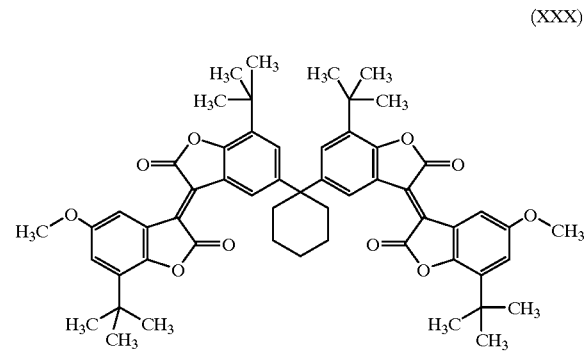

(XXX)

Melting point 259–264° C.

EXAMPLE 13

Preparation of Asymmetrical Isoxindiaos of the Formula (XXXI)

0.5 g (0.0023 mol) of 5-methoxy-7-tert-butylbenzofuranone (XXVIII), 0.6 g (0.0023 mol) of 5,7-di-tert-butyl-3-oxobenzofuranone (XXVI) and 0.2 g of p-toluenesulfonic acid are refluxed in 10 ml of acetic acid for 16 hours. Thereafter 20 ml of water are added, and the mixture is extracted three times with 30 ml of toluene each time. The extracts are washed with water and evaporated to dryness. Addition of 10 ml of methanol and filtration affords 0.5 g of the asymmetrical isoxindigo of the formula:

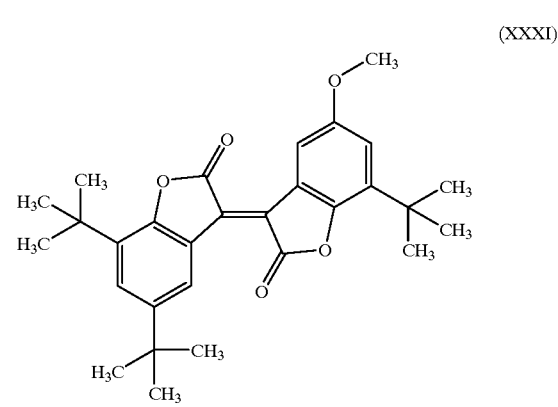

(XXXI)

Melting point 145–153° C.

Heat stabilities, light fastnesses and migration in EPL

|  |  |  | Heat stability | | Migration | Light fastness | | |
|---|---|---|---|---|---|---|---|---|
|  | % Pigment (XXXI) | % TiO2 | GS 4 | DE 3 | 24 hours/80° C. Blue scale | 200 hours | 500 hours | 1000 hours |
| PET | 0.02% |  | 300 | 300 | 5        7–8 | 5 | 5 | 4–5 |

Example 14a

Transesterification 1 g of the compound of the formula (XXI) according to Example 7 is refluxed for 17 hours with 1 ml of methane-sulfonic acid in 60 ml of ethanol. Cooling brings down a red precipitate, which is filtered off, washed with ethanol and water and dried to leave 0.82 g (80% of theory) of ethyl 3-[7,7'-di-tert-butyl-5'-(2-ethoxycarbonylethyl)-2,2'-dioxo[3,3']bibenzofuranyliden-5-yl]propionate of the formula:

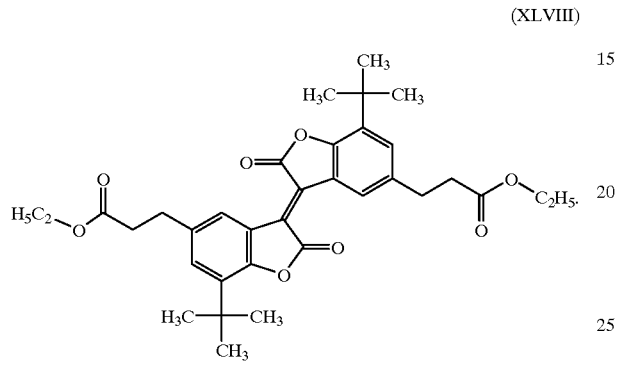

(XLVIII)

Melting point: 125–130° C.

$^1$H-NMR (CDCl$_3$, 300 MHz), δ[ppm]: 1.26 t/3H, 1.43 s/9H, 2.68 t/2H, 3.00 t/2H, 4.16 q/2H, 7.31 d/1H. 8.77 d/1H.

EXAMPLE 14b

Transesterification 1 g of the compound of the formula (XXI) according to Example 7 is refluxed for 17 hours with 1 ml of methane-sulfonic acid in 60 ml of isopropanol. Cooling brings down a red precipitate, which is filtered off, washed with ethanol and water and dried to leave 0.66 g (61% of theory) of isopropyl 3-[7,7'di-tert-butyl-5'-(2-isopropoxycarbonylethyl)-2,2'-dioxo[3,3']bibenzofuranyliden-5-yl]propionate of the formula:

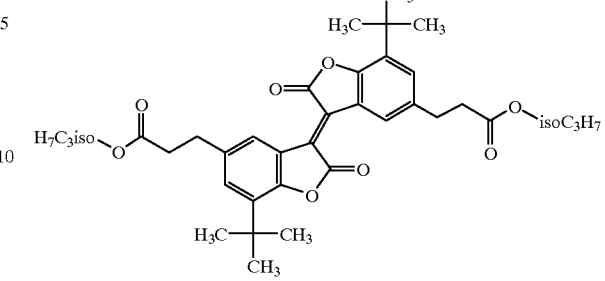

(XLV)

Melting point: 111–116° C.

$^1$H-NMR (CDCl$_3$, 300 MHz), δ[ppm]: 1.22 d/3H, 1.43 s/9H, 2.65 t/2H, 3.00 t/5.02 m/1H, 7.31 d/1H, 8.77 d/1H.

EXAMPLE 14c

Transesterification 1 g of the compound of the formula (XXI) according to Example 7 is refluxed for 17 hours with 1 ml of methane-sulfonic acid in 60 ml of ethoxyethanol. Cooling brings down a red precipitate, which is filtered off, washed with ethoxyethanol and water and dried to leave 0.89 g (75% of theory) of ethoxyethyl 3-[7,7'-di-tert-butyl-5'-(2-ethoxyethoxycarbonylethyl)-2,2'-dioxo[3,3']bibenzofuranyliden-5-yl]propionate of the formula:

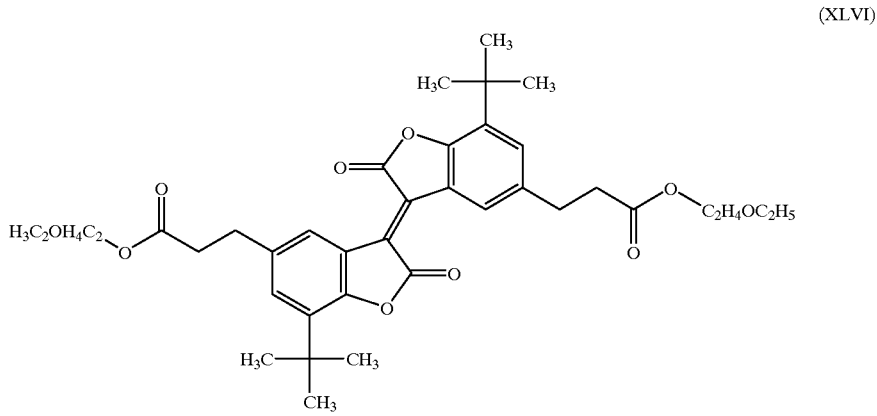

(XLVI)

Melting point: 142–145°C.

¹H-NMR (CDCl₃, 300 MHz), δ[ppm]: 1.21 t/3H, 1.43 s/9H, 2.73 t/2H, 3.01 t/2H, 3.52 q/2H, 3.64 t/2H, 4.26 t/2H, 7.31 d/1H, 8.77 d/1H Preparation of 5,7-di-tert-butyl-3-bromobenzofuranone of the formula:

(XLVII)

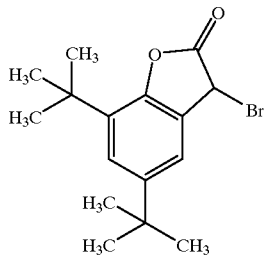

12.9 g (0.052 mol) of 5,7-di-tert-butyl-3-hydroxybenzofuranone are dissolved in 50 ml of toluene and treated with 2.9 ml (0.052 mol) of bromine at 30° C. The mixture is subsequently stirred at 60° C. for 30 minutes. The solvent is distilled off by means of a rotary evaporator. 1 g of the crude product is purified by flash chromatography over silica gel (Merck Silicagel 60, 70–230 mesh ASTM; mobile phase: 1:1 hexane/dichloromethane) to leave 0.26 g (36% of theory) of 5,7-di-tert-butyl-3-bromobenzofuranone (XLVII).

¹H-NMR (CDCl₃, 300 MHz), δ[ppm]: 1.33 s/9H, 1.40 s/9H, 5.47 s/1H, 7.30 d/1H,

| Elemental analysis: | % C | % H | % Br |
|---|---|---|---|
| calc. | 59.09 | 6.51 | 24.57 |
| obs. | 58.96 | 6.53 | 24.36 |

EXAMPLE 15

Preparation of Injection-moulded Plagues in Polyethylene Terephthalate (PET)

0.3 g of the compound of the formula (VIII), prepared as described in Example 1A, is mixed (briefly by hand, then on a tumble mixer at 50 rpm for 5 main) with 1500 g of polyethylene terephthalate (PET) (™MELINDA PURE, ICI), pre dried at 120° C. This mixture is then pre extruded at 270° C. on a 25 mm 1 screw extruder (Collin).

The compound is subsequently processed on a microprocessor controlled injection molding machine (™Ferromatik FM 40, Klökner). The residence time of the polymer (dependent on cycle time, screw volume and plastification volume) is 5 main, during which back pressure and screw speed are kept low. This is beneficial to the homogeneity of the plastic and prevents the generation of heat of friction. The first mouldings (plaques 65×25×1.5 mm in size) are discarded.

The mouldings obtained at 270° C., 280° C., 290° C. and 300° C. are notable for very high heat stability, high light fastness, good migration resistance and high colour strength.

What is claimed is:

1. A process for coloration of a high molecular weight material, which comprises admixing said high molecular weight organic or inorganic material with at least one compound of the formula:

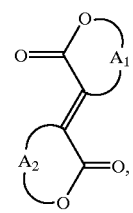

(I)

where $A_1$ and $A_2$ are independently unsubstituted, monosubstituted, disubstituted, trisubstituted or tetrasubstituted o-$C_6$–$C_{19}$arylene.

2. A process according to claim 1, wherein said high molecular weight organic material is admixed with an isoxindigo of the formula:

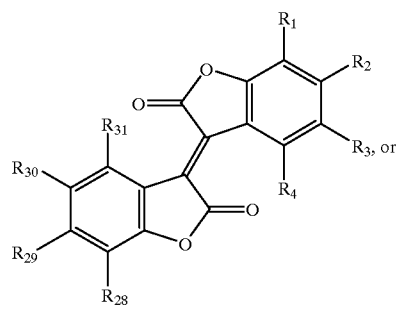

(IIa)

with a bisisoxindigo of the formula

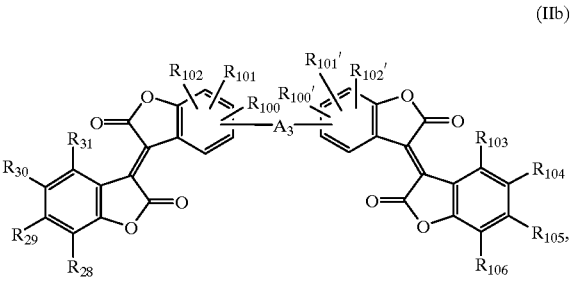

(IIb)

where $A_3$ is a single bond or unsubstituted or halogen-, hydroxyl-, oxo-, cyano-, $R_6$OOC—, $X^+O^-OC$—, $R_6O_3S$—, $X^+O_3^-S$-monosubstituted or -polysubstituted $C_1$–$C_{24}$alkylene or $C_5$–$C_{12}$cycloalkylene, or a polycycle which may be interrupted by heteroatoms, or $C_6$–$C_{24}$aryl and $C_5$–$C_{18}$heteroaryl which may be uninterrupted or singly or multiply interrupted by O, S or $NR_6$, $R_{100}$, $R_{101}$, $R_{102}$, $R_{100'}$, $R_{101'}$, $R_{102'}$ and also $R_{103}$, $R_{104}$, $R_{105}$ and $R_{106}$ each independently have the same meaning as $R_1$, $R_1$, $R_2$, $R_3$, $R_4$ and also $R_{28}$, $R_{29}$, $R_{30}$ or $R_{31}$ are independently H, halogen, cyano, $NO_2$, $R_5$, $NR_5R_6$, $NR_7COR_5$, $NR_7COOR_5$, N=$CR_5R_6$, $CONR_7R_8$, $OR_5$, $COOR_5$, ($C_1$–$C_{12}$alkyl)—$COOR_5$, $COO^-X^+$, $SR_5$, $SOR_5$, $SOR_5$, $SO_2NR_7R_8$, $SO_3R_5$ or $SO_3^-X^+$, and optionally $R_1$ and $R_2$, $R_2$ and $R_3$, $R_3$ and $R_4$ or $R_5$ and $R_6$ and also $R_{28}$ and $R_{29}$, $R_{29}$ and $R_{30}$ or $R_{30}$ and $R_{31}$ may each be additionally joined together by a direct bond (with abstraction of a hydrogen on each of the two atoms connected by the bond) to form a 5- or 6-membered ring, $R_5$ is hydrogen, unsubstituted or halogen- or hydroxyl-, oxo-, cyano-, $R_6OOC$— or $X^+O^-OC$— monosubstituted or -polysubstituted $C_1-C_{25}$alkyl, $C_5-C_{12}$cycloalkyl or $C_2-C_{24}$alkenyl, which may be uninterrupted or singly or multiply interrupted by O, S or $NR_6$, or is unsubstituted or halogen-, nitro-, cyano-, $R_6O$—, $R_6S$—, $R_8R_7NOC$—, $R_8R_7NOC$—, $R_6OOC$—, $X^+O^-OC$—, $R_6O_2S$—, $R_8R_7NO_2S$—, $R_6O_3S$—, $X^+O_3^-S$—, $R_6OCR_7N$— or $R_6OOCR_7N$-monosubstituted or -polysubstituted $C_6-C_{18}$aryl, $C_7-C_{18}$aralkyl or $A_5-A_{18}$heteroaryl, $R_6$ is hydrogen, unsubstituted or halogen- or hydroxyl-, oxo- or cyano-monosubstituted or -polysubstituted $C_1-C_{25}$alkyl or $C_2-C_{24}$alkenyl, which may be uninterrupted or singly or multiply interrupted by O, S or $NR_7$, or is unsubstituted or halogen-, nitro-, cyano-, hydroxyl-, $R_7O$—, $R_7S$—, $R_8R_7N$—, $R_8R_7NOC$—, $R_7OOC$—, HOOCH— or $X^+O^-OC$-monosubstituted or -polysubstituted $C_6-C_{18}$aryl, $C_7-C_{18}$aralkyl or $A_5-A_{18}$heteroaryl, $R_7$ and $R_8$ are singly H, $C_6-C_{18}$aryl, $C_7-C_{18}$aralkyl, unsubstituted or halogen-, hydroxyl- or $C_1-C_{12}$alkoxy-monosubstituted or -polysubstituted $C_1-C_{25}$alkyl or $C_2-C_{24}$alkenyl, or $R_7$ and $R_8$ combine with the common N to form unsubstituted or $C_1-C_4$alkyl-monosubstituted, -disubstituted, -trisubstituted or -tetrasubstituted pyrrolidine, piperidine, piperazine or morpholine or to form carbazole, phenoxazine or phenothiazine, $X^+$ is a cation $Li^+$, $Na^+$, $K^+$, $Mg^{++}_{1/2}$, $Ca^{++}_{1/2}$, $Sr^{++}_{1/2}$, $Ba^{++}_{1/2}$, $Cu^+$, $Cu^{++}_{1/2}$, $Zn^{++}_{1/2}$, $Al^{+++}_{1/3}$, or $[NR_7R_8R_{10}R_{11}]^+$, and $R_{10}$ and $R_{11}$ are singly H, $C_1-C_{25}$alkyl, $C_6-C_{18}$aryl or $C_7-C_{18}$aralkyl.

3. A process according to claim 2, wherein said high molecular weight organic material is admixed with an isoxindigo of the formula:

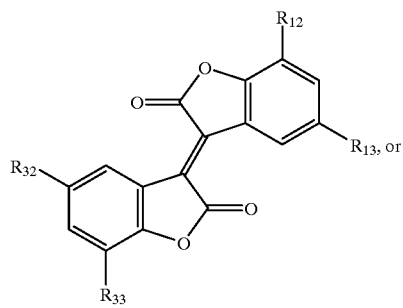

(III)

with a bisisoxindigo of the formula:

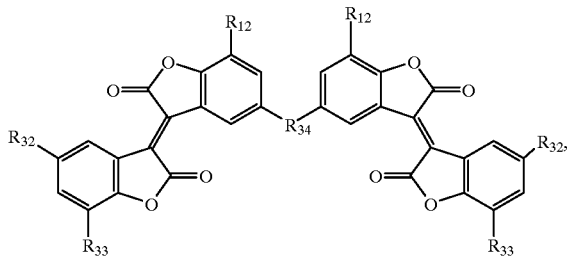

(IV)

where $R_{12}$, $R_{13}$, $R_{32}$ and $R_{33}$ are independently H, halogen, $NO_2$, $R_{14}$, $(C_1-C_{12}alkyl)$-$COOR_5$, $OR_{14}$, $SR_{14}$, $OC_9-C_{18}$alkyl or $SC_9-C_{18}$alkyl, and $R_{34}$ is a single bond, $C_1-C_{24}$alkylene or $C_5-C_{12}$cycloalkylene, where $R_{14}$ is unsubstituted or oxo-, cyano- or $X1+O^-OC$-monosubstituted or -polysubstituted $C_1-C_{25}$alkyl, which may be uninterrupted or singly or multiply interrupted by O, or is unsubstituted or halogen-, nitro-, cyano-, $R_{16}O$—, $R_{17}R_{16}N$—, $R_{17}R_{16}NOC$—, $R_{16}OCR_{18}N$— or $R_{16}OOCR_{18}N$-monosubstituted or -polysubstituted $C_6-C_{10}$aryl or $C_7-C_{10}$aralkyl, $X1+$ is a cation $Na^+$, $K^+$, $Mg^{++}_{1/2}$, $Ca^{++}_{1/2}$, $Zn^{++}_{1/2}$, $Al^{+++}_{1/3}$, or $[NR_{16}R_{17}R_{18}R_{19}]^+$, and $R_{16}$ and $R_{17}$ are independently H, $C_6-C_{10}$aryl, $C_7-C_{10}$aralkyl, unsubstituted or halogen-, hydroxyl- or $C_1-C_4$alkoxy-monosubstituted or -polysubstituted $C_1-C_8$alkyl, or $R_{16}$ and $R_{17}$ combine with the common N to form unsubstituted or $C_1-C_4$alkyl-monosubstituted, -disubstituted, -trisubstituted or -tetrasubstituted pyrrolidine, piperidine, piperazine or morpholine, and $R_{18}$ and $R_{19}$ are independently H, $C_1-C_8$alkyl, $C_6-C_{10}$aryl or $C_7-C_{10}$aralkyl.

4. A process according to claim 3, wherein said high molecular weight organic material is admixed with an isoxindigo of the formula:

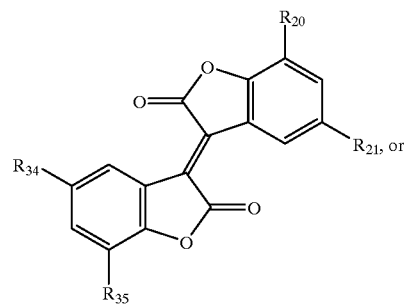

(V)

with a bisisoxindigo of the formula:

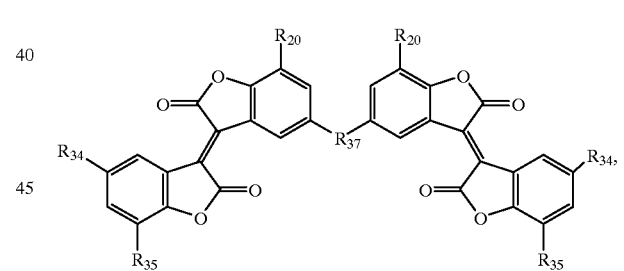

(VI)

where $R_{20}$, $R_{21}$, $R_{34}$ and $R_{35}$ are independently H, chlorine, $R_{22}$, $C_2H_5$—COOH, $C_2H_5$—COO$(C_1-C_{12}$alkyl), $OR_{22}$, $SR_{22}$, $OC_9-C_{18}$alkyl or $SC_9-C_{18}$alkyl and $R_{37}$ is a single bond, $C_1-C_8$alkylene or $C_5-C_6$cycloalkylene, $R_{22}$ is unsubstituted or oxo-, cyano- or oxo-, cyano- or $X2^+O^-OC$-monosubstituted or -polysubstituted $C_1-C_8$alkyl, which may be uninterrupted or singly or multiply interrupted by O, or is $C_6-C_{10}$aryl or $C_7-C_{10}$aralkyl, $X2^+$ is a cation $Na^+$, $K^+$, $Mg^{++}_{1/2}$, $Ca^{++}_{1/2}$, $Zn^{++}_{1/2}$, $Al^{+++}_{1/3}$, or $[NR_{24}R_{25}R_{26}R_{27}]^+$, $R_{24}$, $R_{25}$ and $R_{26}$ are independently H, $C_{1-C4}$alkyl or phenyl, and $R_{27}$ is H, $C_1-C_8$alkyl, $C_6-C_4$aryl or $C_7-C_{10}$aralkyl.

5. A process according to claim 1, wherein said high molecular weight organic material is a polymer having a dielectric constant $\geq 2.5$.

6. A compound of the formula:

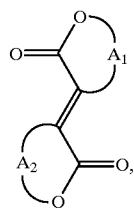
(VII)

or a compound of the bisisoxindigo structure (IIb), where $A_1$ and $A_2$ are independently unsubstituted or monosubstituted, disubstituted, trisubstituted or tetrasubstituted o-$C_6$–$C_{18}$arylene, with the provisos that $A_1$ and $A_2$ are not both phen-1,2-ylene, 6-methylphen-1,2-ylene, 6-isopropylphen-1,2-ylene, 6-tert-butylphen-1,2-ylene, 4-methyl-6-tert-butylphen-1,2-ylene, 4-tert-butyl-6-methylphen-1,2-ylene, 4,6-di-tert-butylphen-1,2-ylene, 4-methoxy-6-tert-butylphen-1,2-ylene, 5-methoxyphen-1,2-ylene, 3-carboxy-5-methylphen-1,2-ylene, 3-methoxycarbonyl-5-methylphen-1,2-ylene, anthraquinon-1,2-ylene, phenanthren-9,10-ylene or 1-oxa-2,2-dimethyl-3-acetoxy-5-methylacenaphthen-6,7-ylene, and that when $A_1$ is phen-1,2-ylene $A_2$ is not 5-methoxyphen-1,2-ylene, 4,6-dihydroxyphen-1,2-ylene, naphth-1,2-ylene or naphth-2,1-ylene and when $A_1$ is 3-methoxycarbonyl-5-methylphen-1,2-ylene $A_2$ is not 3,5-dimethylphen-1,2-ylene, and o-$C_6$–$C_{18}$arylene is attached to the lactone oxygen with the first locant indicated for the diradical.

7. A composition consisting of 2 to 10, compounds of the formula (I):

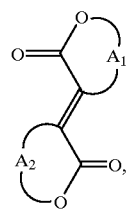
(I)

where $A_1$ and $A_2$ are independently unsubstituted or monosubstituted, disubstituted, trisubstituted or tetrasubstituted o-$C_6$–$C_{18}$arylene, or (VII) and/or (IIb) according to claim 6.

8. A process for preparing a compound of the formula:

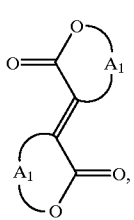
(VIII)

or a mixture consisting of the compounds of the formulae:

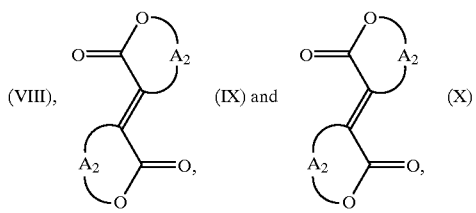
(VIII), (IX) and (X)

where $A_1$ and $A_2$ are independently unsubstituted or monosubstituted, disubstituted, trisubstituted or tetrasubstituted o-$C_6$–$C_{18}$arylene, which comprises dehydrating a compound of the formula:

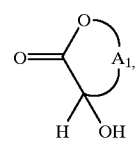
(XI)

or a mixture of compounds of the formulae:

(XI) and 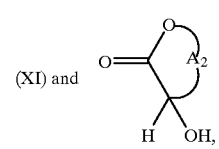
(XII)

or tautomers thereof.

9. A process for condensing 3-oxofuranonyl compounds with 3-methylenefuranonyl compounds, which comprises reacting differently substituted 3-methylenefuranonyl compounds of the formula (XIII):

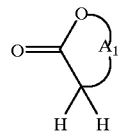
(XIII)

with 3-oxofuranonyl compounds of the formula (XIV):

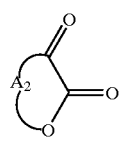
(XIV)

using hydrochloric acid, organic acids or bases to form asymmetrical isoxindigos (IIa) or bisisoxindigos (IIb), where $A_1$ $A_2$ are different and independently conform to the meaning given in one of claims 1 to 4.

10. A process for preparing a compound of the formula:

(VIII)

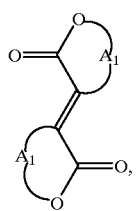

or a mixture consisting of the compounds of the formulae:

(IX)

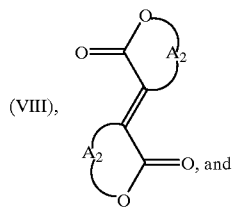

(VIII), (X)

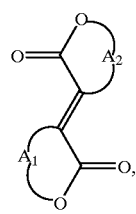

where $A_1$ and $A_2$ are independently unsubstituted or monosubstituted, disubstituted, trisubstituted or tetrasubstituted o-$C_6$–$C_{18}$arylene by
a) reacting a compound of the formula (XIII),
or
b) a mixture of the compounds of the formulae:

(XIII) and (XL)

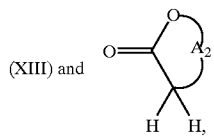

with
c) a halogenating agent to form a compound of the formula (XLI):

(XLI)

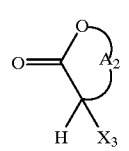

and/or (XLII)

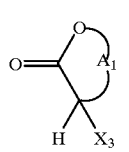

where
$X_3$ is halogen such as iodine, bromine or chlorine and d) simultaneously or subsequently dimerizing at a temperature within the range from −20 to 250° C. to form a compound of the formula (VIII), (IX) and/or (X).

11. A composition of matter comprising high molecular weight organic material and at least one compound of the formula (I) prepared by the process of claim 1.

12. An ink or colorant for coatings, printing inks, mineral oils, greases or waxes, or colored or pigmented plastics, non-impact printing material, color filters, cosmetics or toners, comprising high molecular weight organic material and at least one compound of the formula (I) prepared as claimed in claim 1 in a coluristically effective amount.

13. A process for preparing an ink or colorant for coatings, printing inks, mineral oils, greases or waxes, or colored or pigmented plastics, non-impact printing material, color filters, cosmetics or toners which comprises admixing a high molecular weight organic material with a colouristically effective amount of a compound of formula (I) as defined in claim 1.

14. A process according to claim 5, wherein said high molecular weight organic material is a polyester, polycarbonate (PC), polystyrene (PS), polymethyl methacrylate (PMMA), polyamide, polyethylene, polypropylene, styrene/acrylonitrile (SAN) or arylonitrile/butadiene/styrene (ABS).

15. A composition according to claim 7 consisting of 2 or 3 compounds of formula (I).

16. The process of claim 10, wherein dimerization is conducted at a temperature within the range from 50 to 200° C.

17. A composition of matter comprising high molecular weight organic material and a compound of formula (VII) or (IIb) according to claim 6.

18. A composition of matter comprising high molecular weight organic material and a composition according to claim 7.

19. An ink or colorant for coatings, printing inks, mineral oils, greases or waxes, or colored or pigmented plastics, non-impact printing material, color filters, cosmetics or toners, comprising high molecular weight organic material and a colouristically effective amount of a compound of formula (VII) or (IIb) as claimed in claim 6.

20. An ink or colorant for coatings, printing inks, mineral oils, greases or waxes, or colored or pigmented plastics, non-impact printing material, color filters, cosmetics or toners, comprising high molecular weight organic material and a colouristically effective amount of a composition as claimed in claim 7.

21. A process for preparing an ink or colorant for coatings, printing inks, mineral oils, greases or waxes, or colored or pigmented plastics, non-impact printing material, color filters, cosmetics or toners which comprises admixing a high molecular weight organic material with a colouristically effective amount of a compound of formula (VII) as claimed in claim 6.

22. A process for preparing an ink or colorant for coatings, printing inks, mineral oils, greases or waxes, or colored or pigmented plastics, non-impact printing material, color filters, cosmetics or toners which comprises admixing a high molecular weight organic material with a colouristically effective amount of a composition as claimed in claim 7.

* * * * *